(12) United States Patent
Wakeford et al.

(10) Patent No.: US 10,843,086 B2
(45) Date of Patent: *Nov. 24, 2020

(54) SYSTEM AND METHOD FOR CROSS-PLATFORM PARTY FORMATION

(71) Applicant: Electronic Arts Inc., Redwood City, CA (US)

(72) Inventors: Kent Wakeford, San Francisco, CA (US); Clifford J. Harrington, San Francisco, CA (US)

(73) Assignee: Electronic Arts Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/551,513

(22) Filed: Aug. 26, 2019

(65) Prior Publication Data

US 2020/0047073 A1    Feb. 13, 2020

Related U.S. Application Data

(63) Continuation of application No. 16/033,079, filed on Jul. 11, 2018, now Pat. No. 10,398,987, which is a continuation of application No. 15/816,705, filed on Nov. 17, 2017, now Pat. No. 10,022,627, which is a continuation of application No. 15/466,674, filed on
(Continued)

(51) Int. Cl.
*A63F 13/795* (2014.01)
*A63F 13/30* (2014.01)
*A63F 13/847* (2014.01)
*A63F 13/23* (2014.01)
(Continued)

(52) U.S. Cl.
CPC ............ *A63F 13/795* (2014.09); *A63F 13/12* (2013.01); *A63F 13/23* (2014.09); *A63F 13/40* (2014.09); *A63F 13/537* (2014.09); *A63F 13/847* (2014.09)

(58) Field of Classification Search
CPC .......... A63F 13/12; A63F 13/23; A63F 13/40; A63F 13/537; A63F 13/847; A63F 13/79; A63F 13/795; A63F 2300/5546; A63F 2300/5566
See application file for complete search history.

(56) References Cited

U.S. PATENT DOCUMENTS 5,838,907 A    11/1998  Hansen
6,425,822 B1    7/2002  Hayashida
(Continued)

FOREIGN PATENT DOCUMENTS

WO    WO 2006/013429    2/2006
WO    WO 2008/157477    12/2008
(Continued)

*Primary Examiner* — Jasson H Yoo
(74) *Attorney, Agent, or Firm* — Knobbe, Martens, Olson & Bear, LLP

(57) ABSTRACT

A virtual space is provided to users via client computing devices. Device information related to a client computing platform used by a user to interact with the virtual space may be obtained. Different users using different client computing platforms may be provided with different in-game capabilities such as user roles, content items, levels, and/or other content or actions available for the user in the virtual space based on the client computing platform used by the users to access the virtual space. The device information may be used to facilitate enhanced party formation between users of the virtual space.

20 Claims, 13 Drawing Sheets

Related U.S. Application Data

Mar. 22, 2017, now Pat. No. 9,868,063, which is a continuation of application No. 14/084,370, filed on Nov. 19, 2013, now Pat. No. 9,623,322.

(51) Int. Cl.
*A63F 13/40* (2014.01)
*A63F 13/537* (2014.01)

(56) References Cited

U.S. PATENT DOCUMENTS

| | | | |
|---|---|---|---|
| 7,465,231 B2 | 12/2008 | Lewin et al. | |
| 7,568,973 B2 | 8/2009 | Iddings | |
| 7,890,586 B1 | 2/2011 | McNamara | |
| 7,930,215 B2 | 4/2011 | Pombo et al. | |
| 7,997,987 B2 | 8/2011 | Johnson et al. | |
| 8,016,678 B1 | 9/2011 | Hutter et al. | |
| 8,126,426 B2 | 2/2012 | Fridman | |
| 8,209,277 B2 | 6/2012 | Kumar et al. | |
| 8,292,725 B2 | 10/2012 | Wikander | |
| 8,360,873 B1 | 1/2013 | Wickett | |
| 8,401,009 B1 | 3/2013 | Dorsey et al. | |
| 8,423,889 B1 | 4/2013 | Zagrie et al. | |
| 9,415,306 B1 | 8/2016 | Harrington et al. | |
| 9,623,322 B1 * | 4/2017 | Wakeford | A63F 13/537 |
| 9,868,063 B1 * | 1/2018 | Wakeford | A63F 13/12 |
| 10,022,627 B2 * | 7/2018 | Wakeford | A63F 13/77 |
| 10,398,987 B2 * | 9/2019 | Wakeford | A63F 13/12 |
| 2001/0053691 A1 * | 12/2001 | Harma | A63F 13/12 |
| | | | 455/419 |
| 2002/0112081 A1 | 8/2002 | Armstrong | |
| 2002/0132608 A1 | 9/2002 | Shinohara | |
| 2002/0138582 A1 | 9/2002 | Chandra | |
| 2002/0158917 A1 | 10/2002 | Sinclair et al. | |
| 2003/0172121 A1 | 9/2003 | Evans et al. | |
| 2005/0261062 A1 | 11/2005 | Lewin | |
| 2006/0015580 A1 | 1/2006 | Gabriel et al. | |
| 2006/0136964 A1 | 6/2006 | Diez et al. | |
| 2007/0011256 A1 | 1/2007 | Klein | |
| 2007/0219000 A1 | 9/2007 | Aida | |
| 2008/0090659 A1 | 4/2008 | Aguilar | |
| 2008/0102960 A1 * | 5/2008 | Jiao | A63F 13/12 |
| | | | 463/42 |
| 2008/0176618 A1 | 7/2008 | Toompere | |
| 2008/0207327 A1 | 8/2008 | Van Luchene | |
| 2008/0228636 A1 | 9/2008 | Gattis | |
| 2009/0077463 A1 | 3/2009 | Koster | |
| 2009/0088249 A1 | 4/2009 | Kay | |
| 2009/0170608 A1 | 7/2009 | Herrmann | |
| 2010/0029386 A1 | 2/2010 | Pitsch | |
| 2010/0245912 A1 | 9/2010 | Mount et al. | |
| 2010/0248822 A1 | 9/2010 | Migos | |
| 2011/0022641 A1 | 1/2011 | Werth et al. | |
| 2011/0082703 A1 | 4/2011 | Higbie | |
| 2011/0118028 A1 | 5/2011 | Sobel | |
| 2011/0145050 A1 | 6/2011 | Gross | |
| 2011/0179180 A1 | 7/2011 | Schleifer | |
| 2011/0237335 A1 | 9/2011 | Holloway | |
| 2011/0250972 A1 | 10/2011 | Horbay | |
| 2011/0276883 A1 | 11/2011 | Cabble | |
| 2012/0007569 A1 | 1/2012 | Sumimoto | |
| 2012/0011211 A1 | 1/2012 | Smith | |
| 2012/0038550 A1 | 2/2012 | Lemmey et al. | |
| 2012/0192087 A1 | 7/2012 | Lemmey | |
| 2012/0252582 A1 | 10/2012 | Hilleman | |
| 2012/0265568 A1 | 10/2012 | Marshall | |
| 2012/0277003 A1 | 11/2012 | Eliovits et al. | |
| 2012/0311041 A1 * | 12/2012 | Aonuma | H04L 67/24 |
| | | | 709/204 |
| 2012/0331058 A1 | 12/2012 | Huston et al. | |
| 2013/0085886 A1 | 4/2013 | Satish et al. | |
| 2013/0086467 A1 | 4/2013 | Weber et al. | |
| 2013/0109480 A1 | 5/2013 | Yuan | |
| 2013/0117105 A1 | 5/2013 | Dyor et al. | |
| 2013/0117377 A1 | 5/2013 | Miller | |
| 2013/0125113 A1 | 5/2013 | Do | |
| 2013/0310156 A1 | 11/2013 | Gadher | |
| 2014/0040760 A1 | 2/2014 | Randell | |
| 2014/0194208 A1 | 7/2014 | Splaine | |
| 2014/0310036 A1 | 10/2014 | Grosso | |
| 2014/0324965 A1 | 10/2014 | Ralston | |
| 2015/0011277 A1 | 1/2015 | Wakeford | |
| 2015/0051001 A1 * | 2/2015 | Linden | A63F 13/87 |
| | | | 463/42 |
| 2015/0120408 A1 | 4/2015 | Liu | |
| 2018/0318714 A1 | 11/2018 | Wakeford et al. | |

FOREIGN PATENT DOCUMENTS

| | | |
|---|---|---|
| WO | WO 2013/123122 | 8/2013 |
| WO | WO 2015/003069 | 1/2015 |

* cited by examiner

SYSTEM AND METHOD FOR CROSS-PLATFORM PARTY FORMATION

CROSS-REFERENCE TO RELATED APPLICATIONS

This application is a continuation of U.S. patent application Ser. No. 16/033,079, filed Jul. 11, 2018, titled "SYSTEM AND METHOD OF DISPLAYING DEVICE INFORMATION FOR PARTY FORMATION," which is a continuation of U.S. patent application Ser. No. 15/816,705, filed Nov. 17, 2017, titled "SYSTEM AND METHOD OF DISPLAYING DEVICE INFORMATION FOR PARTY FORMATION," which is a continuation of U.S. patent application Ser. No. 15/466,674, filed Mar. 22, 2017, titled "SYSTEM AND METHOD OF DISPLAYING DEVICE INFORMATION FOR PARTY FORMATION," which is a continuation of U.S. patent application Ser. No. 14/084,370, filed Nov. 19, 2013, titled "SYSTEM AND METHOD OF DISPLAYING DEVICE INFORMATION FOR PARTY FORMATION,' the disclosures of which are hereby incorporated herein by reference in their entirety.

FIELD OF THE DISCLOSURE

This disclosure relates to systems and methods for obtaining device information of a client computing platform used by a user to interact with a virtual space of a game and providing the device information to other users to facilitate party formation decisions based on the device information.

BACKGROUND

Different classes of devices such as laptop computers, tablet computers, gaming consoles, smartphones, and/or other classes of devices may have technical capabilities that are different from one another. For example, laptop computers may have different technical capabilities than smartphones. Furthermore, different types of devices within a given class of device may have different capabilities from one another. For example, a particular model of smartphone may have different technical capabilities than another model of smartphone. Leveraging these differences for gameplay of a game may provide dynamic gaming experiences for users depending on the class and/or type of device used to access the game. Furthermore, online games in which party formation may occur between players (e.g., to form an alliance, co-operatively play together as a team, have one user play under the direction of another user, etc.) may benefit from being able to view, query, or otherwise obtain device information related to other users.

SUMMARY

One aspect of the disclosure relates to an online gaming system configured to display information related to client computing platforms used by users of an online game to facilitate enhanced party formation decision making by the users. The system may comprise one or more physical computer processors configured to execute computer program components. The computer program components may comprise a space component, a device information component, a party formation component, and/or other components The space component may be configured to execute an instance of a virtual space in which the online game takes place. The space component may facilitate presentation of the online game to the users on client computing platforms. The space component may be configured to implement multi-user parties formed by the users to cooperatively play individual portions of the online game.

The device information component may be configured to obtain device information indicative of the features and functions of the different client computing platforms used by the users to interact with the instance of the virtual space. Device information may include a first set of information indicative of the features and functions of a first client computing platform used by a first user of the virtual space. The device information may include a second set of information indicative of the features and functions of a second client computing platform used by a second user of the virtual space.

The party formation component configured to effectuate presentation of request interfaces configured to receive entry and/or selection from users for forming multi-user parties. Request interfaces may include, for viewing by users of the virtual space, the obtained device information indicative of the features and functions of the different client computing platforms used by the users of the virtual space. The party formation component may be configured to effectuate presentation of a first request interface that is configured to receive entry and/or selection from the first user to form a first multi-user party with other users. The other users may include the second user. The first request interface may include, for viewing by the first user, the second set of information related to the second client computing platform used by the second user.

Responsive to request confirmation by the second user, the party formation component may be configured to process the request to form the first multi-user party including the first user and the second user. Processing may include associating the first user and the second user with the first multi-user party directly or indirectly. The space component may be configured to thereafter implement the first multi-user party for the first user and the second user in the virtual space.

Another aspect of the disclosure relates to a method of displaying information related to client computing platforms used by users of an online game to facilitate enhanced party formation decision making by the users. The method may be implemented in a computer system including one or more physical processors and storage media storing machine-readable instructions. The method may comprise the operations of: executing an instance of a virtual space in which the online game takes place; obtaining device information indicative of the features and functions of the different client computing platforms used by the users to interact with the instance of the virtual space; effectuating presentation of request interfaces configured to receive entry and/or selection from users for forming multi-user parties; processing requests to form multi-user parties; implementing the multi-user parties in the virtual space; and/or other operation.

Executing an instance of a virtual space in which the online game takes place may include facilitating presentation of the online game to the users on client computing platforms. The execution may be configured to implement multi-user parties formed by the users to cooperatively play individual portions of the online game.

Device information may include a first set of information indicative of the features and functions of a first client computing platform used by a first user of the virtual space, and a second set of information indicative of the features and functions of a second client computing platform used by a second user of the virtual space.

Effectuating presentation of request interfaces may include presenting a first request interface that is configured to receive entry and/or selection from the first user to form a first multi-user party with other users, the other users may include the second user. The first request interface may include, for viewing by the first user, the second set of information related to the second client computing platform used by the second user. Responsive to request confirmation by the second user, an operation of processing the request to form the first multi-user party including the first user and the second user by associating the first user and the second user with the first multi-user party directly or indirectly may be performed. Thereafter an operation of implementing the first multi-user party for the first user and the second user in the virtual space may be performed.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
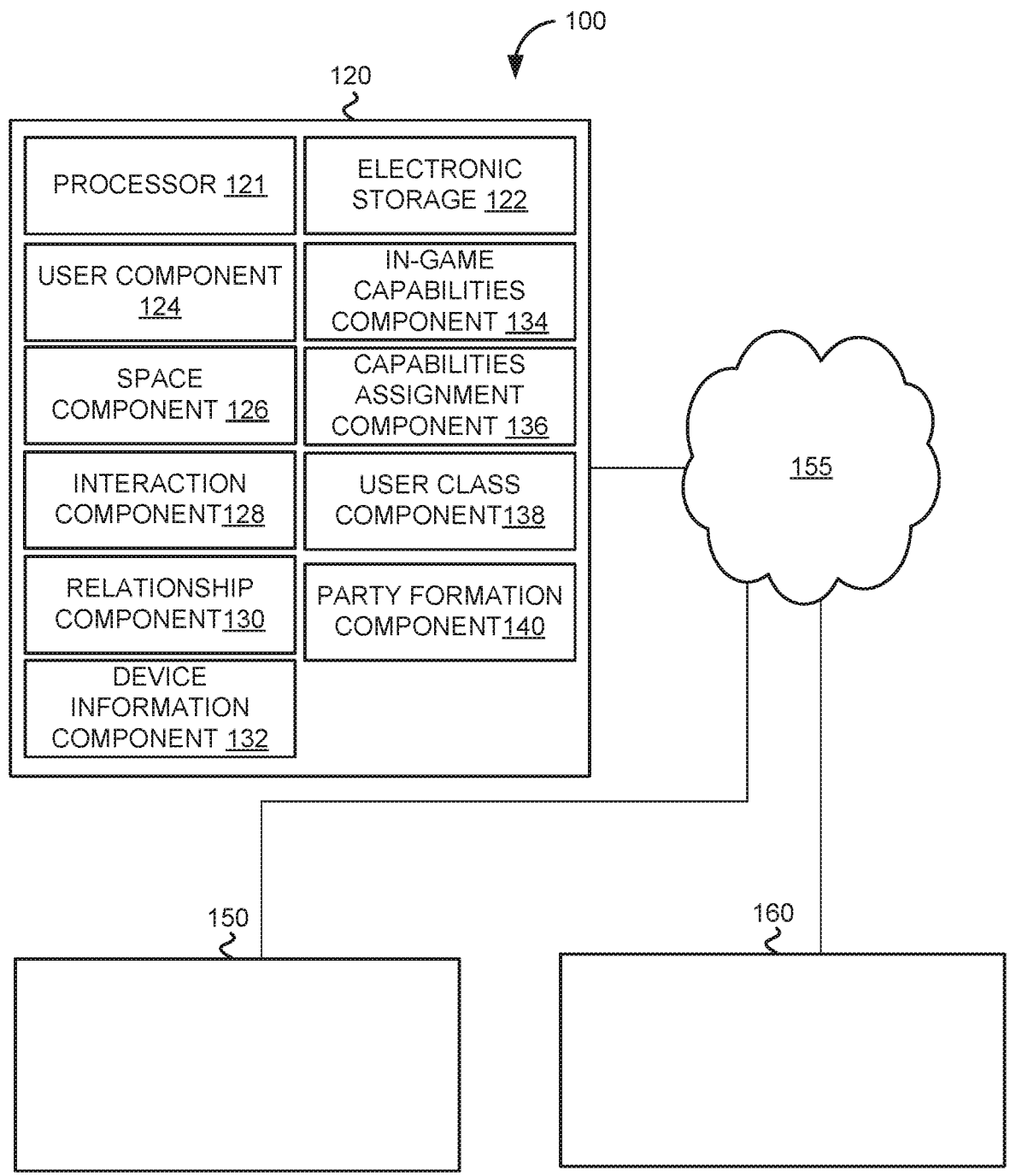
FIG. 1 illustrates a system configured to obtain and provide device information to facilitate party formation decisions based on the device information, according to an aspect of the invention.

FIG. 1 illustrates an online gaming system 1000 configured to display information related to client computing platforms used by users of a virtual space to facilitate enhanced party formation decision making by the users of the virtual space. The device information may be information indicative of the features and functions of the different client computing platforms used by the users to interact with an instance of the virtual space. Providing the virtual space may include hosting the virtual space over a network 155, such as the Internet. In some implementations, the virtual space may include an online game taking place in the virtual space. In some implementations, system 100 may include a server 120. The server 120 may be configured to communicate with one or more client computing platforms 150 according to a client/server architecture. The client computing platforms 150 may include, for example, a cellular telephone, a smartphone, a laptop, a tablet computer, a desktop computer, a television set-top box, smart TV, a gaming console, and/or other device as described herein and/or other considerations. The users may access the system 100 and/or the virtual space via client computing platforms 150.

The server 120 may be configured to execute one or more computer program components. The computer program components may include one or more of a user component 124, a space component 126, an interaction component 128, a relationship component 130, a device information component 132, an in-game capabilities component 134, a capabilities assignment component 136, a user class component 138, a party formation component 140, and/or other components.

The user component 124 may be configured to access and/or manage one or more user profiles and/or user information associated with users of the system 100. The one or more user profiles and/or user information may include information stored by server 120, one or more of the client computing platforms 150, and/or other storage locations. The user profiles may include, for example, information identifying users (e.g., a username or handle, a number, an identifier, and/or other identifying information) within the virtual space, security login information (e.g., a login code or password), virtual space account information, subscription information, virtual currency account information (e.g., related to currency held in credit for a user), relationship information (e.g., information related to relationships between users in the virtual space), virtual space usage information, demographic information associated with users, interaction history among users in the virtual space, information stated by users, purchase information of users, browsing history of users, a client computing platform identification associated with a user, device information for each client computing platform used by the user to interact with the virtual space, a phone number associated with a user, and/or other information related to users.

The space component 126 may be configured to execute an instance of the virtual space in which the online game takes place and to facilitate presentation of the online game to the users on client computing platforms. The space component 126 may be configured to implement the instance of the virtual space executed by the computer components to determine state of the virtual space. The state may then be communicated (e.g., via streaming visual data, via object/position data, and/or other state information) from server 120 to client computing platforms 150 for presentation to users. The state determined and transmitted to a given client computing platform 150 may correspond to a view for a user character being controlled by a user via the given client computing platform 150. The state determined and transmitted to a given client computing platform 150 may correspond to a location in the virtual space. The view described by the state for the given client computing platform may correspond, for example, to the location from which the view is taken, the location the view depicts, and/or other locations, a zoom ratio, a dimensionality of objects, a point-of-view, and/or view parameters of the view. One or more of the view parameters may be selectable by the user.

The instance of the virtual space may comprise a simulated space that is accessible by users via clients (e.g., client computing platforms 150) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer components may be synchronous, asynchronous, and/or semi-synchronous.

The above description of the manner in which state of the virtual space is determined by space component 126 is not intended to be limiting. The space component 126 may be configured to express the virtual space in a more limited, or more rich, manner. For example, views determined for the virtual space representing the state of the instance of the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space executed by space component 126, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user character may be controlled by the user with which it is associated. The user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

The users may participate in the instance of the virtual space (e.g., the online game) by controlling one or more of the available user controlled elements in the virtual space. Control may be exercised through control inputs and/or commands input by the users through client computing platforms 150. The users may interact with each other through communications exchanged within the virtual space. Such communications may include one or more of textual chat, instant messages, private messages, voice communications, and/or other communications. Communications may be received and entered by the users via their respective client computing platforms 150.

Communications may be routed to and from the appropriate users through server 120 (e.g., through space component 126).

The space component 126 may be configured to implement multi-user parties formed by the users of the virtual space. Multi-user parties may facilitate cooperative play by the users of the virtual space in individual portions of the online game. Some aspects of multi-user parties are described in more detail below with reference made to the capabilities assignment component 136, the party formation component 140, and/or other components described herein.

The space component 126 may be configured to implement user roles that are associated with the ability to perform an in-game action and/or associated with access to particular in-game content within the virtual space. For example, access to in-game content within the virtual space may refer to access to in-game content associated with the individual portions of the online game accessed by users participating in multi-user parties. Different classes of client computing platforms may be associated with different in-game actions and/or different access to in-game content (e.g., described in more detail herein with reference to the in-game capability component 134, capabilities assignment component 136, and/or other computer components described herein).

The interaction component 128 may be configured to monitor interactions of the users with the virtual space and/or each other within the virtual space. This may include monitoring, for a given user, one or more times at which the given user is logged in to the virtual space, areas of the virtual space the given user views or interacts with or in, other users the given user interacts with, the nature and/or content of interactions of the given user with other users, activities participated in within the virtual space, level, powers, or skill attained in the virtual space, inventory items obtained in the virtual space, and/or other interactions of the given user with the virtual space and/or other users. Some or all of the information generated by interaction component 128 in monitoring the interactions of the users may be stored to the user profiles managed by user component 124.

At a given time, interaction component 128 may determine a set of users that are currently engaged with the virtual space and/or a set of users that are currently not engaged with the virtual space. Being engaged with the virtual space may refer to being logged in to the virtual space, performing some action or interaction within the virtual space within some period of time (e.g., the least 2 minutes), and/or taking some other action indicating ongoing and contemporaneous engagement with the virtual space.

The interaction component 128 may be configured to determine, for individual users, an activity metric that indicates an activity level within the virtual space. The activity metric may be determined based on one or more of log-in frequency, amount of time logged in to the virtual space within a rolling time period (e.g., over the last day, week, month, or other rolling time period), average amount of time logged in to the virtual space over some length of time (e.g., per day, per week, and/or other length of time), average log in session time over a rolling time period, number of inter-user communications over a length of time, number of inter-user communications per log-in, number of relationships with other users in the virtual space, number of new relationships with other users in the virtual space within a rolling time period, amount of real world money and/or virtual currency spent in the virtual space, and/or other activity parameters.

The relationship component 130 may be configured to establish relationships between users within the virtual space. Such relationships may include one or more of friendships, guilds (with guild-mates), alliances, connections, followers, and/or other relationships. The relationship component 130 may establish relationships based on relationship requests and acceptances received from users. Establishment of a relationship may be initiated by a single communication (e.g., a request) initiated by a given user requesting a relationship between the given user and one or more other users. Establishment of a relationship may require a first communication from the given user to be approved by the one or more other users. Relationships may include one or more types of relationships that have a functional purpose or impact within the virtual space, and/or one or more types of relationships that a social construct within the virtual space that does not have a functional result.

The device information component 132 may be configured to obtain device information indicative of the features and functions of the different client computing platforms 150 used by the users to interact with the instance of the virtual space and/or an online game taking place in the virtual space. The device information may include information that indicates a general class of client computing platforms, a particular type of client computing platforms, and/or other granularity of client computing platform identifying information. The class of client computing platforms may include general descriptions such as information indicating that the client computing platform is a desktop computing device, a laptop computing device, a tablet device, a mobile device (e.g., smart phone), a gaming console, a smart TV, and/or other general description. The type of client computing platforms may include a particular brand, model, operating system, and/or other description that more specifically identifies the client computing platform 150 used to interact with the virtual space.

In some embodiments, device information indicative of the features and functions of the different client computing platforms may include activity metrics (e.g., such as activity metrics determined by the interaction component 128) which are individually associated with each of the different client computing platforms used by the users of the virtual space. The activity metrics associated with a particular client computing platform may be determined based on one or more of log-in frequency when using a particular client computing platform, amount of time logged in to the virtual space within a rolling time period when using a particular client computing platform (e.g., over the last day, week, month, or other rolling time period), average amount of time logged in to the virtual space over some length of time when using a particular client computing platform (e.g., per day, per week, and/or other length of time), average log in session time over a rolling time period when using a particular client computing platform, number of inter-user communications over a length of time when using a particular client computing platform, number of inter-user communications per log-in when using a particular client computing platform, number of new relationships generated with other users in the virtual space within a rolling time period when using a particular client computing platform, amount of real world money and/or virtual currency spent in the virtual space when using a particular client computing platform, and/or other activity parameters which may be associated with the individual client computing platform used by the users.

In some embodiments, device information may include a first set of information indicative of the features and functions of a first client computing platform (and/or other client computing platforms) used by a first user of the virtual space. The first set of information may include at least the class of the first client computing platform used by the first user. Device information may include a second set of information indicative of the features and functions of a second client computing platform (and/or other client computing platforms) used by a second user of the virtual space. The second set of information may include at least the class of the second client computing platform used by the second user. In the examples provided below, and for illustrative purposes only, the class of the first client computing platform may be a "laptop device" and the class of the second client computing platform may be a "mobile device".

The device information component 132 may passively obtain the device information and/or sets of device information based on communications with client computing platform 150 such as by reading headers or other portions of communications from client computing platform to identify the device being used to interact with the virtual space. For example, the device information component 132 may read Hypertext Transfer Protocol ("HTTP") headers to determine a browser used to interact with the virtual space and accordingly identify the client computing platform that operates the browser. Agents used to interact with the virtual space other than a browser may be operating on client computing platform 150. Such agents may encode the device information in communications with server 120.

The device information component 132 may actively obtain the device information such as by querying or otherwise causing the client computing platform 150 to provide the device information. For example, device information component 132 and/or an agent operating on the client computing platform 150 may cause a prompt for the device information to be input.

The device information component 132 may determine when a given user changes the client computing platform used to interact with the virtual space and/or online game taking place within the virtual space. For example, a user may switch from using a laptop device to using a mobile device to interact with the virtual space. The device information component 132 may detect the change and accordingly associate the new device information with the user.

Figure 3:
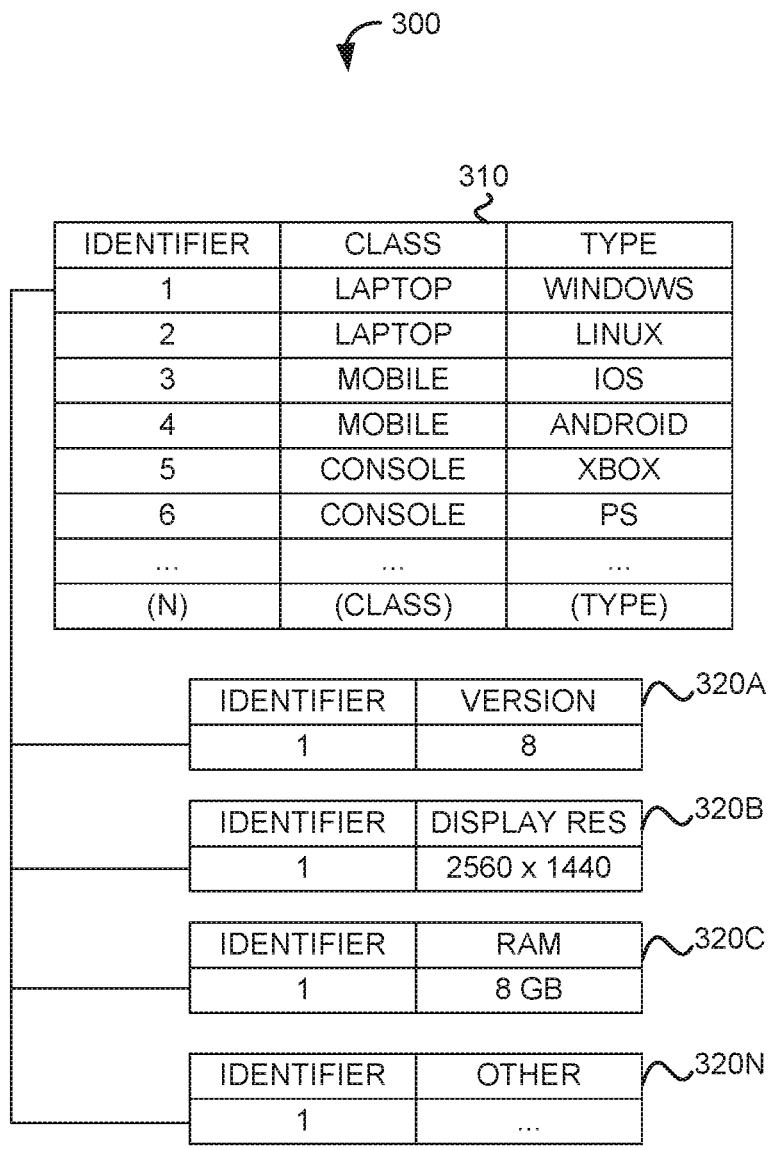
FIG. 3 illustrates an example of a data structure configured to store device information, according to an aspect of the invention.

As an illustrative example, FIG. 3 shows a data structure 300 configured to store device information, according to an aspect of the invention. The data representations of data structure 300 and other data structures illustrated herein are for illustrative purposes only. The data structures may take different forms and may store some or all of the illustrated data values (as well as others not illustrated). Data structure 300 may be stored in electronic storage (e.g., electronic storage 122 illustrated in FIG. 1).

As illustrated, data structure 300 may store device information for various devices that may be used to interact with the virtual space. For example, data structure 300 may store various devices and their corresponding characteristics, which may indicate device capabilities. For example, a device table 310 may store an identifier (which may be auto-incremented, not an actual identifier such as a MAC address), a class of device, a type of device, and/or other information. Each device may have characteristics that are stored in characteristics tables 320 (illustrated in FIG. 3 as characteristics 320A, 320B, 320C, . . . , 320N). For example, the device indicated by identifier 1 may be a laptop running the WINDOWS operating system and have characteristics indicating that the device runs an operating system that is version 8, has a display resolution of 2560×1440, has 8 GB of RAM, and/or has other characteristics.

Data structure 300 may therefore be used to store a listing of devices and corresponding device information so that device characteristics and capabilities may be known by the system.

Returning to FIG. 1, the in-game capabilities component 134 may be configured to determine in-game capabilities based on the device information. In-game capabilities may include, for example, a user role that the user may play associated with one or more in-game actions (e.g., a frontline battle role to participate in combat, a healer role to heal users, a support role, etc.), in-game content that is available for use in the virtual space, a game level or scene available in the virtual space, and/or other capabilities related to the virtual space that may be made available to the user based on the device information.

The in-game capabilities component 134 may determine custom in-game capabilities for the user by comparing device requirements of in-game capabilities with abilities of a given client computing platform based on corresponding device information and/or consulting pre-stored in-game capabilities that are available for the given client computing platform 150.

In some embodiments, for example, the in-game capabilities component 134 may determine custom in-game capabilities for the user based on one or more client computing platform requirements for one or more in-game capabilities. Different in-game capabilities may be associated with different client computing platform requirements. For example, a given in-game capability may involve initiating a processor-intensive game event such as a virtual battle that requires (or otherwise would be optimal with) a particular processing ability, relate to providing rich visual displays that require (or otherwise would be optimal with) a particular screen resolution, and/or relate to requiring (or otherwise would be optimal with) other abilities of the client computing device 150 in order to appropriately render or process the game event.

The in-game capabilities component 134 may use the device information (obtained by the device information component 132) for a given client computing platform being used by a user to interact with the virtual space and compare the device information with the requirements in order to identify in-game capabilities for which the given client computing platform 150 satisfies the device requirements. For example, if a given in-game capability requires or would be more optimal with a minimum processor speed, then in-game capabilities component 134 may determine that the user of a client computing platform 150 that meets or exceeds that minimum processor speed qualifies for the given in-game capability. The in-game capabilities component 134 may perform this analysis for each of the in-game capabilities. In some embodiments, the in-game capabilities component 134 may perform this analysis on more than one device requirement. For example, the given in-game capability may require or be more optimal with both a minimum processor speed and a minimum screen resolution.

In some embodiments, the in-game capabilities component 134 may determine custom in-game capabilities for the user based on an association of a given client computing platform with corresponding in-game capabilities that are available for the device. For example, in-game capabilities component 134 may identity a given client computing platform 150 used to interact with the virtual space and obtain in-game capabilities that are available for the device.

Whichever method of determining in-game capabilities is used, the in-game capabilities component 134 may determine the in-game capabilities in real-time or near real-time such that changes in the client computing platform 150 used by a user to interact with the virtual space may be accounted for such that in-game capabilities available to the user may be updated depending on the client computing platform the user is currently using. For example, when the user switches from a console device to a mobile device to interact with the virtual space, in-game capabilities component 134 may switch the custom in-game capabilities that are made available to the user.

Figure 4:
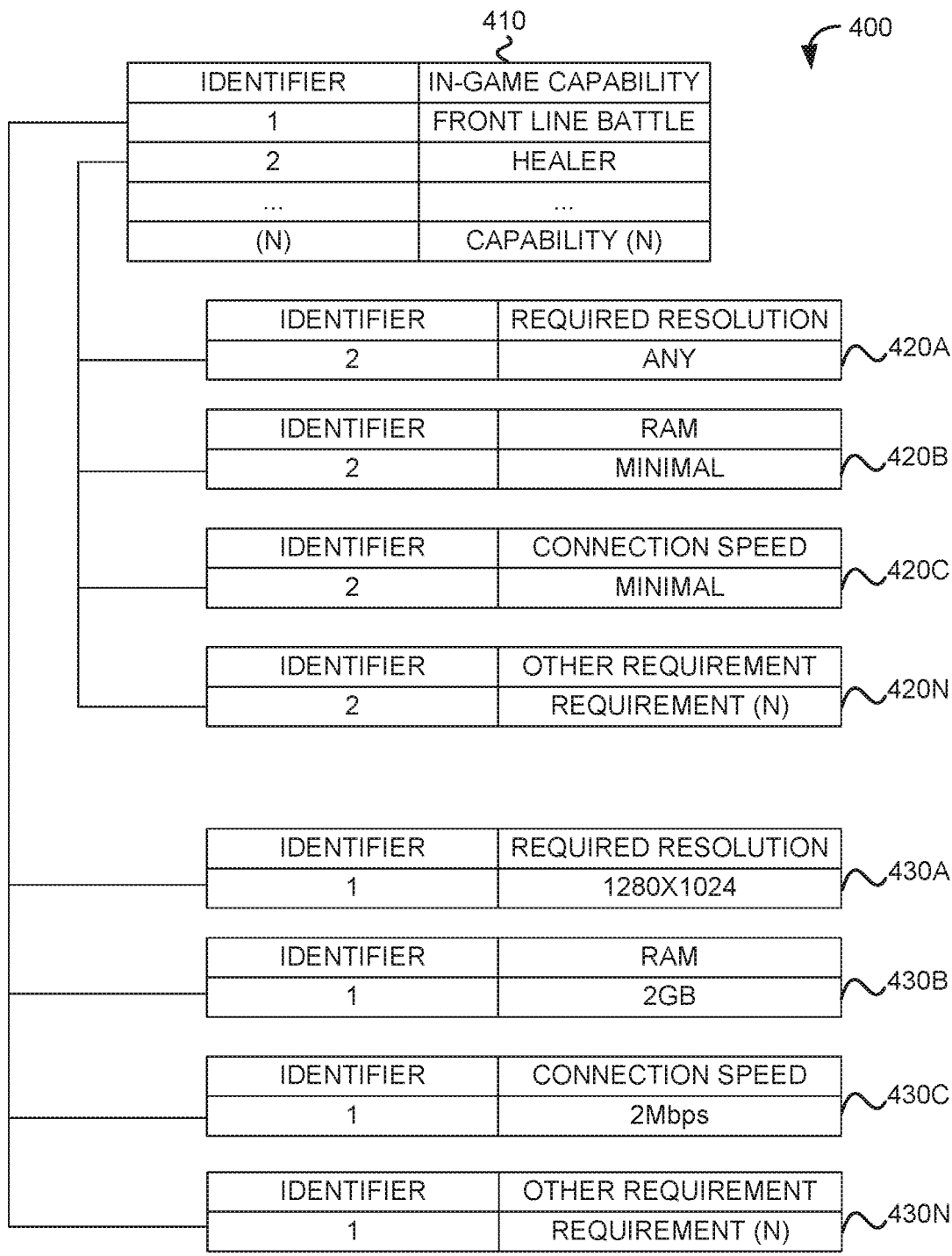
FIG. 4 illustrates an example of a data structure configured to store in-game capabilities with corresponding device requirements, according to an aspect of the invention.

As an illustrative example, FIG. 4 depicts a data structure 400 configured to store in-game capabilities with corresponding device requirements, according to an aspect of the invention. Data structure 400 may include a table 410 that stores an identifier (which may be automatically incremented) and an in-game capability. Each in-game capability may be associated with a corresponding device requirement stored in various device requirement tables (illustrated in FIG. 4 as tables 420A, 420B, 420C, 420N, 430A, 430B, 430C, 430N).

Different in-game capabilities may be associated with different device requirements. As illustrated, for example, a front line battle role may require a certain resolution, RAM, network connection speed, and/or other requirements that are different than the requirements of a healer role. The healer role may require less intensive processing/display/network bandwidth resources than the front line battle role. By storing one or more requirements of a given in-game capability, the data structure 400 (and logic/rules that use the information stored in the data structure) may be used by the system to compare device information (e.g., obtained from the user, the user device, and/or data structure 300) with the requirements the given in-game capability in order to determine whether the in-game capability is appropriate for the user of the device associated with the device information.

The data structure 400 may be used to impose minimum or other requirements for a given in-game capability, allowing for easy addition and assignment of requirements for in-game capabilities.

Figure 5:
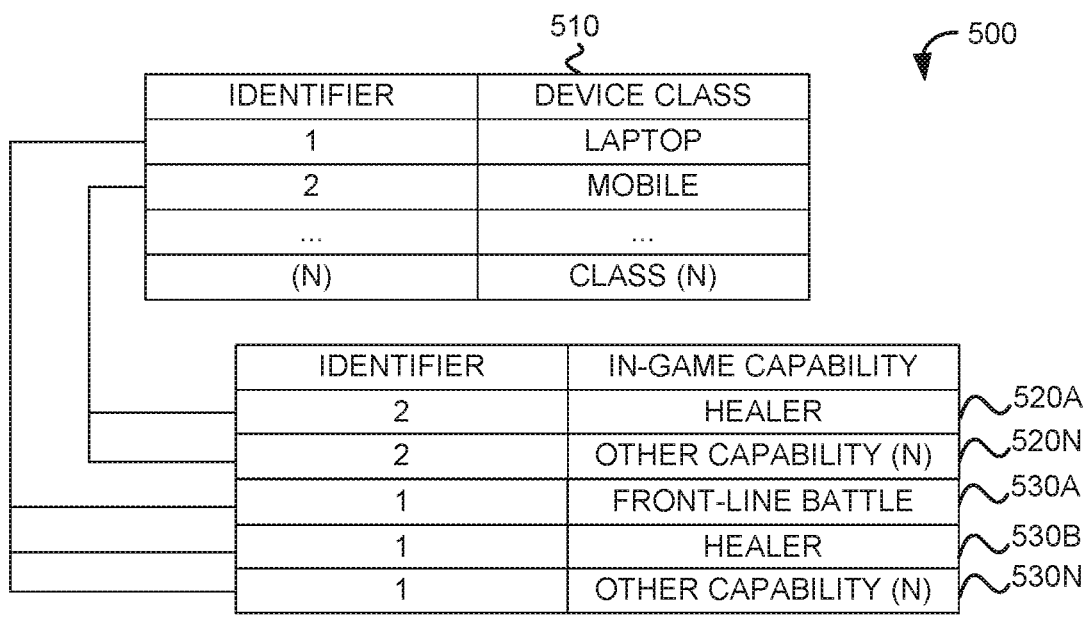
FIG. 5 illustrates an example of a data structure configured to store classes of devices and corresponding in-game capabilities, according to an aspect of the invention.

FIG. 5 depicts a data structure 500 configured to store classes of devices and corresponding in-game capabilities, according to an aspect of the invention. Data structure 400 may include a table 510 that stores an identifier (which may be automatically incremented) and a device class (and/or other device information). A given device class may be associated with one or more in-game capabilities, stored in record 520 (illustrated in FIG. 5 as record 520A, 520N, 530A, 530B, 530N). Data structure 500 may be used to store associations between a given device (or class of device) and one or more in-game capabilities. For example, a laptop device may be associated with a front-line battle role capability, a healer role capability, and/or other capability while a mobile device may be associated with less (and/or different degrees of) in-game capabilities. The data structure 500 may therefore be used to store associations of permissible in-game capabilities for given devices. As such, the data structure 500 (and logic/rules that use the information stored in the data structure) may allow for easy association between devices and permissible in-game capabilities without having to specify device requirements for the in-game capabilities.

As would be appreciated, a combination of the data structures 400 and 500 may be used to determine in-game capabilities based on the device information. To the extent that a given device is not represented in these or other data structures, default in-game capabilities may be provided by the system. Such default in-game capabilities may include none, all, or a subset of all possible in-game capabilities.

Returning to FIG. 1, the capabilities assignment component 136 may be configured to assign a given in-game capability to the user from among in-game capabilities that are available for the user, such as the capabilities determined by the in-game capabilities component 134. In some embodiments, the capabilities assignment component 136 may assign an in-game capability to the user based on previous gameplay, indications by the user, manual assignments from one user (e.g., a team leader of a team of players, such as a formed multi-user party of players), determinations made by the in-game capabilities component 134, and/or other factors by which assignments of in-game capabilities may be made.

Previous gameplay may indicate a given user's propensity or desire to have or otherwise use a given in-game capability. For example, the given user may prefer to play as a front-line battler rather than a support role. Thus, whenever the user accesses the virtual space using a client computing platform for which the front-line battler role capability is available, the capabilities assignment component 136 may assign that role to the user. Likewise, indications by the user such as a profile setting, option setting, or other indication from the user that indicates a preference for particular in-game capabilities may be used to assign in-game capabilities to the user.

In some embodiments, the capabilities assignment component 136 may assign a given in-game capability for the user based on input from another user such as a leader of a team or party (e.g., explicit or implicit group of players playing together in common or otherwise coordinated with one another). The team (or party) leader may thus assign a given in-game capability to the user based on a role or other capability that the team leader would like the user to fill. In some embodiments, only available in-game capabilities for a given user may be presented for selection to the other user (e.g., the team leader). In some embodiments, all in-game capabilities may be presented for selection by the other user and post-selection verification may be performed to ensure that the given user is not assigned with an in-game capability that is not available for the given user (e.g., the team leader may not be allowed to assign a front line battler role to a user who is using a device that does not support or otherwise is not meet the requirements of that role).

Figure 2:
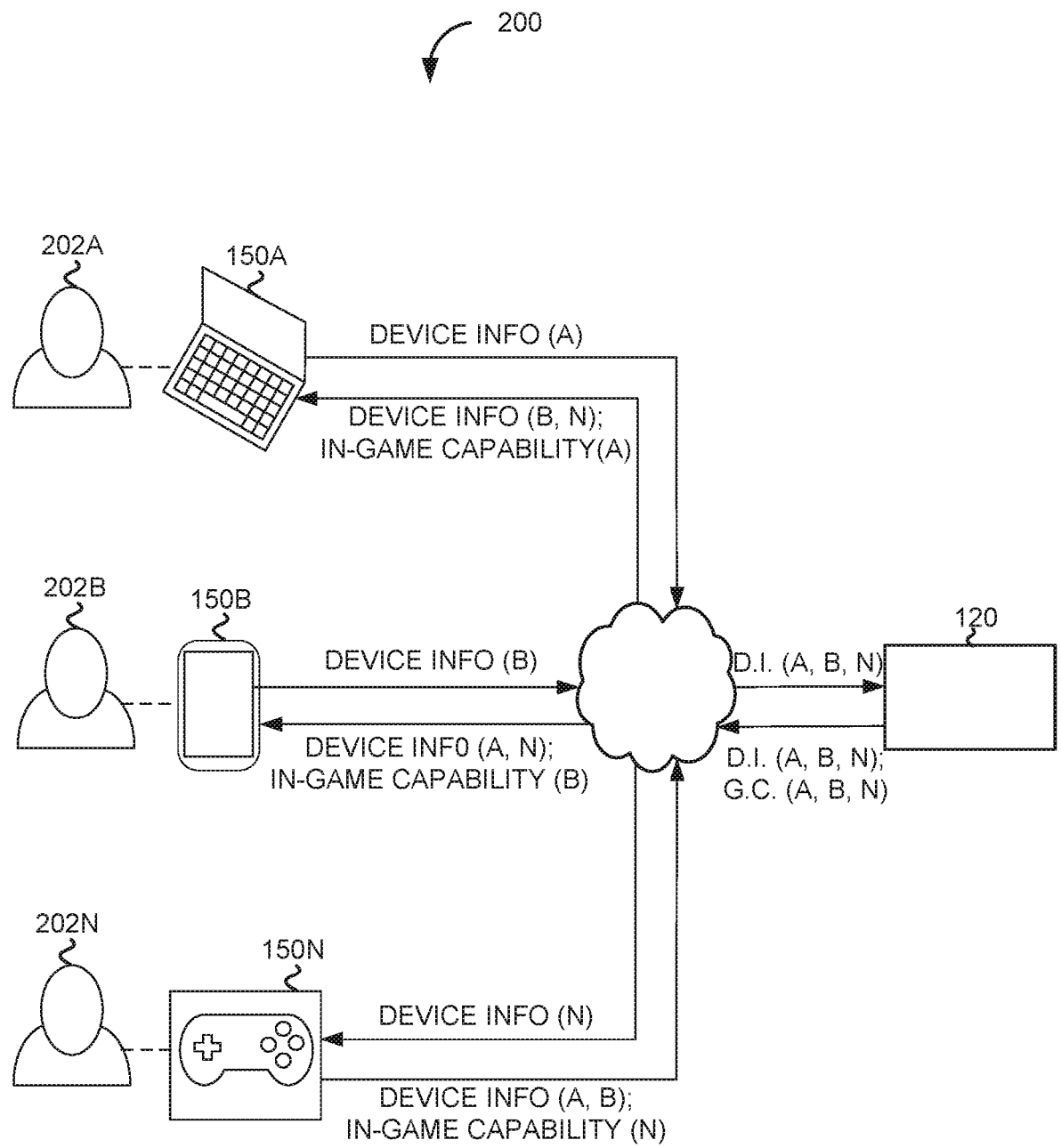
FIG. 2 illustrates a data flow diagram of providing device information and in-game capabilities to users based on device information related to a client computing platform used to access the virtual space of a game, according to an aspect of the invention.

Referring now to FIG. 2, there is illustrated a data flow diagram 200 of providing device information and in-game capabilities to users 202 based on device information related to a client computing platform 150 used to access the virtual space of a game, according to an aspect of the invention. A given user 202 (illustrated in FIG. 2 as user 202A, 202B, . . . , 202N) may access the virtual space using a corresponding client computing platform 150 (illustrated in FIG. 2 as client computing platforms 150A, 150B, . . . , 150N). Client computing platform 150 may individually provide device information to server 120. The device information may be provided as a device indicator that identifies or otherwise indicates the client computing platform 150 (e.g., identifies the class, type, and/or other characteristic of the device), header information in data packets, and/or other information that identifies the client computing platform 150. Server 120 may obtain the device information. Device indicators may include a visual indicator, an audible indicator, and/or a tactile indicator. For example, a visual indicator may be a graphical representation of device information (e.g., a depiction of a laptop), a qualitative description of the device information (e.g., a written description of the laptop specifications), and/or other considerations.

In some embodiments, user 202 and/or client computing platform 150 may provide an indication of a class of client computing platform 150 used to interact with the virtual space. For example, user 202 may provide information that specifies the class during a logon procedure. In these embodiments, server 120 may receive the class and lookup particular, more specific information, related to the class based on the user profile. For example, the user profile may include information that identifies more than one client computing platform 150 used by the user to interact with the virtual space.

Server 120 may determine detailed device information based on the class information provided during the logon and lookup particular device information for the class of device in the user profile. For example, the user profile may include an indication that the user uses a laptop having a particular processor and display resolution, a mobile device having a particular operating system, and a particular console device. Upon logon, the user may indicate that the user is using a "laptop," which may then be used to lookup in the user profile more detailed information for the laptop device.

Upon obtaining the device information, server 120 may determine one or more corresponding in-game capabilities (illustrated in FIG. 2 as G.C. (A, B, N) for the user based on the device information. Server 120 may provide the in-game capabilities to each respective user 202 in relation to the virtual space.

In some embodiments, server 120 may provide the device information of a given user 202 to other users 202. For example, server 120 may provide user 202A with device information (B) related to user 202B and device information (N) related to user 202N. Similarly, server 120 may provide user 202B with device information (A) related to user 202A and device information (N) related to user 202N. Likewise, server 120 may provide user 202N with device information (A) related to user 202A and device information (B) related to user 202B. Server 120 may provide some or all of the device information of which it is aware to various users 202.

Returning to FIG. 1, the user class component 138 may be configured to determine user classes. A user class may include one or more users that use similar or identical devices to interact with the virtual space. As such, a given user class may include users that have at least some in-game capabilities in common that are available to each user. Such user classes may include, for illustrative purposes only, "console users," "laptop users," "mobile device users," and/or other classes of users, which may be defined by the device information of a device used by users of the user class to interact with the virtual space. User classes may help to facilitate assignment of in-game capabilities to other users (e.g., who may be a member of a party of users), invite users to form a team and/or party, or otherwise classify users based on the device they use to interact with the virtual space.

The party formation component 140 may be configured to effectuate presentation of request interfaces configured to receive entry and/or selection from users to form multi-user parties and/or teams. Herein the term 'request interface' may generally refer to any interface presented to one or more users of the virtual space which may facilitate the features and functionality of forming multi-user parties as described herein. For example, described in more detail later herein, a request interface may be an instance of an interface which a user may be presented within the virtual space when the user wants to form multi-user parties (e.g., a pop-up window used to initiate a party formation request for sending to one or more other users), an instance of an interface which a user may be presented when other users (or other formed parties) are attempting to form multi-user parties with them (e.g., an interface configured to allow a user to confirm or deny a party formation request sent to them by another user or party), modifications to existing interfaces to include the features and functionality of party formation requests as described herein (e.g., an existing interface modified to facilitate party formation request), and/or other considerations of a request interface suitable for the intended purposes described herein.

In some embodiments, a request interface may include, for viewing by users who may be initiating and/or receiving a party formation request, device information indicative of the features and functions of the different client computing platforms used by the users of the virtual space. For example, a user who is initiating a party formation request may be presented a request interface including device information for all users of the virtual space, a particular group of users of the virtual space, and/or a select user and/or group of users of the virtual space. Briefly, the inclusion of device information of users of the virtual space in the request interface may facilitate enhanced party formation decision making between users. For example, users may selectively initiate and/or respond to party formation requests based on the particular client computing platform type, class, corresponding in-game capabilities, access to in-game content, preferred roles, and/or other feature and/or functionality attributed to the users of which they may potentially form a multi-user party with.

In some embodiments, request interfaces may include device indicators related to the device information of the users of the virtual space, in order to make such information easily accessible to the user viewing the request interface. Such device indicators may include a visual indicator, an audible indicator, a tactile indicator, and/or other indicator that identifies or otherwise indicates device information for the client computing platform used by the users in the virtual space.

In the following descriptions, for illustrative purposes only, the recitation of a "first request interface" herein may refer to an instance of a request interface presented to a user which may be configured to receive entry and/or selection by the user to initiate a request to form one or more multi-user parties with other users of the virtual space. The recitation of a "second request interface" may herein refer to an instance of a request interface presented to a user who has received or is receiving a request to form a party sent to them from one or more other users. The second request interface may be configured to receive entry and/or selection by the receiving user to confirm or deny the request.

For example, the first request interface may be configured to receive entry and/or selection from the first user to form a first multi-user party with the second user and/or other users. The first request interface may include, for viewing by the first user, the second set of information related to the second client computing platform used by the second user. The second request interface may be configured to receive entry and/or selection by the second user to confirm (or deny) the request to form the first multi-user party (e.g., initiated by the first user). The second interface may include, for viewing by the second user, the first set of information related to the first client computing platform used by the first user. In some embodiments, the second request interface may be presented to the second user (and/or other users) in response to the first user initiating the request to from the first multi-user party via the first request interface.

The formation of multi-user parties may be considered in a variety of ways. In some embodiments, forming the first multi-user party may include creating a new party in which the first user, second user, and/or other users are associated as members. Initiation of the request to form the first multi-user party (e.g., new party) via the first request interface by the first user may include entry and/or selection by the first user in which the second user is selected or "invited" to join a new party which is to be the first multi-user party (e.g., upon confirmation by the second user).

In some embodiments, forming the first multi-user party may include the first user selecting and/or "inviting" the second user to join an existing party which the first user is a member. Upon confirmation by the second user, the existing party may become the first multi-user party in which the first user and second user (and/or other users) are associated with.

In some embodiments, formation of the first multi-user party may include the first user requesting to join an existing party of which the second user is a member. Upon confirmation by the second user, the existing party may become the first multi-user party of which the first user, second user, and/or other users are associated with.

Confirmation by the second user to form the first multi-user party in accordance with any of the formation methods described above may be accomplished by entry and/or selection by the second user of "Accepting", selecting a "Yes" option, and/or otherwise confirming the request via the second request interface. Responsive to request confirmation by the second user, the party formation component 140 may be configured to process the request to form the first multi-user party including the first user and the second user (and/or other users) by associating the first user and the second user (and/or other users) with the first multi-user party directly or indirectly. A direct association may refer to the first user directly identifying the second user when sending the first multi-user party request. Indirect association may refer to the first user identifying a party of which the second user is a member when sending the first multi-user party request (e.g., the first user and second user will be associated by virtue of second user being a member of the party).

Device information may be included in the instances of the request interfaces and/or other interface(s) such that the users of the virtual space may be made aware of the device information of the other users when making decision to form multi-user parties. In order for the device information to be included in the instances of the request interfaces, the party formation component 140 may be configured to receive a provisioning request to provide the device information of users to other users of the virtual space. In some embodiments, the provisioning request to provide device information (e.g., to be included in a request interface) may include requesting device information associated with users specifically identified by a user inputting the provisioning request. In some embodiments, a provisioning request may be initiated by entry and/or selection by a user in an instance of a request interface and/or other interface(s) wherein the specific users are identified.

In some embodiments, the provisioning request to provide device information (e.g., to be included in a request interface) may refer to requesting device information associated with users who are part of a larger set of users not specifically identified by the user inputting the provisioning request (e.g., users of a particular class client computing platform).

In some embodiments, the provisioning request may be a request which is made automatically such that a user does not have to explicitly initiate the provisioning request for device information (e.g., the provisioning request may be initiated automatically when an instance of a request interface is presented to one or more users).

For example, the party formation component 140 may be configured to receive a provisioning request to provide device information including the second set of information to the first user, such that the first user may be made aware of the device information associated with the second client computing platform used by the second user. The provisioning request may be initiated by virtue of the first user specifically identifying the second user. The provisioning request may be initiated by other mechanisms or techniques. Responsive to the provisioning request, the party formation component 140 may be configured to provide the device information including the second set of information to the first user. In some embodiments, the device information including the second set of information may be provided to the first user in the first request interface, and/or other interface(s).

Presented below are illustrative examples of various embodiments of the first request interface and the second request interface used to form the first multi-user party between the first user, the second user, and/or other users of the virtual space. It is to be noted that the following descriptions are not intended to be limiting, and may be attributed with more or less functionality as described without departing from the scope and intent of the invention.

Figure 10:
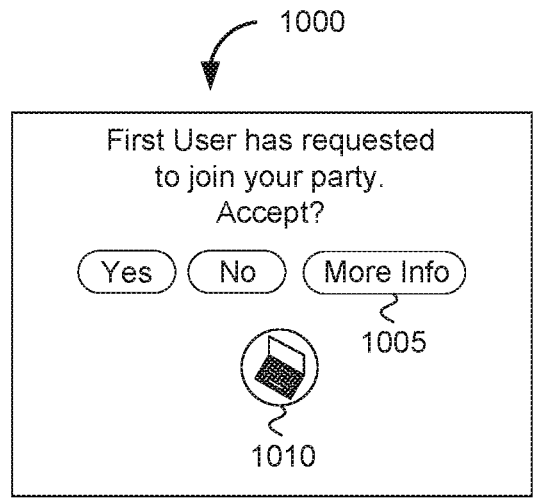
FIG. 10 illustrates a request interface used to display device information and allow users to confirm or deny a party formation request related to another user who is making the party formation request, according to an aspect of the invention.

FIG. 10 illustrates an embodiment of the second request interface 1000 related to the first multi-user party formation request between the first user and the second user. The second request interface 1000 may be presented to the second user in response to the first user requesting (e.g., via the first request interface) to join a party of which the second user is a member of (e.g., to thereafter form the first multi-user party).

The second request interface 1000 may include, for viewing by the second user, device information 1005, 1010 indicative of the features and functions of the first client computing platform used by the first user. The second request interface 1000 may include the device information 1005, 1010 by virtue of a provisioning request initiated and processed by the party formation component 140 to include the device information in the second request interface 1000, as described herein.

Device information 1005, 1010 may include the first set of information related to the first client computing platform used by the first user. In particular, the second request interface 1000 may include device information 1010, such as a device indicator of the client computing platform class used by the first user (e.g., showing a graphic depiction of a laptop class client computing platform). The second user may either confirm or deny the request based on the device class used by the first user and/or other device information included in the first set of information shown in the second request interface 1000.

Figure 11:
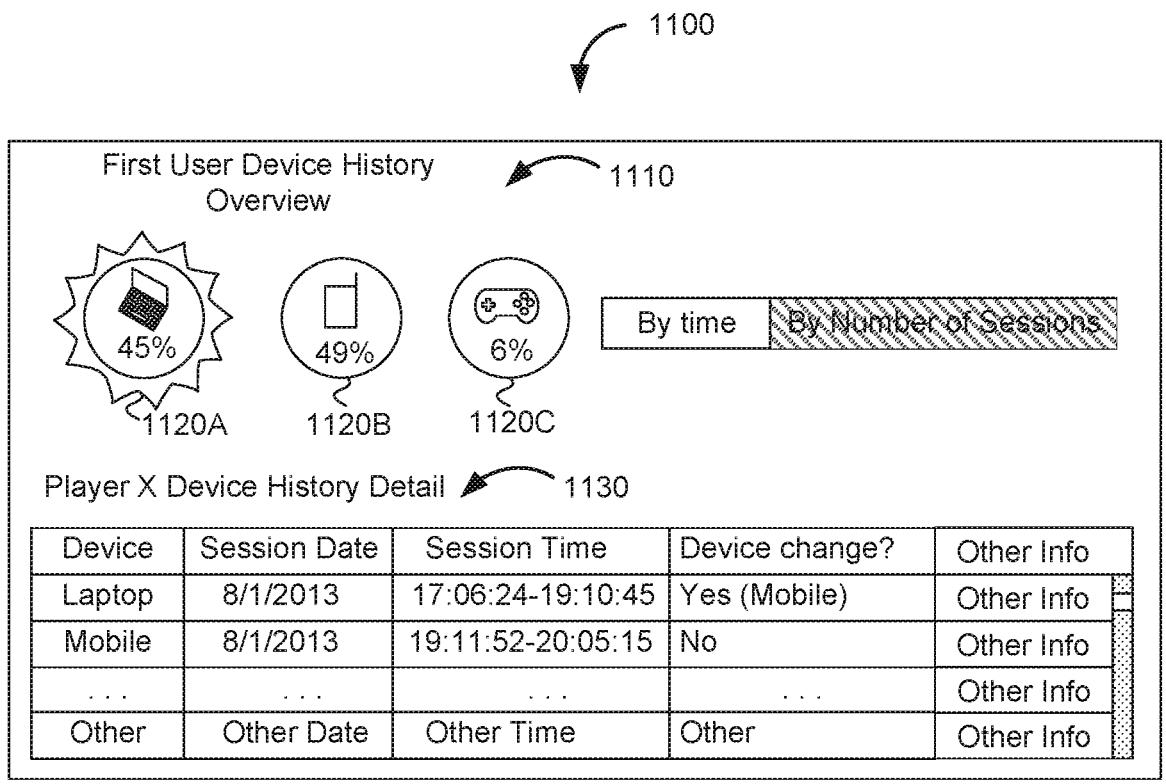
FIG. 11 illustrates an interface used to display device usage information relating to a user, according to an aspect of the invention.

In some embodiments, the second request interface 1000 may include an option to view more device information 1005 through an additional interface (e.g., pop up window) and/or as part of the second request interface 1000 (e.g., drop down menus appear and/or the second request interface 1000 expands). In particular, FIG. 11 illustrates an interface 1100 used to display more device information when the selection to view more device information is made by the second user at the second request interface 1000 (FIG. 10). The interface 1100 may depict device usage information 1110, 1130 of the first user (e.g., activity metrics associated with each of the client computing platforms used by the first user), according to an aspect of the invention.

The interface 1110 may include device usage overview information 1110, detailed device usage information 1130, and/or other information.

The overview information 1110 may include device indicators (e.g., visual indicators) showing some or all of the available client computing platforms classes used by the first user within the virtual space (e.g., currently depicting a laptop 1120A, mobile device 1120B, and gaming console 1120C). The overview information 1110 may additionally indicate the percentage of usage of the different client computing platforms by the first user within the virtual space (e.g., as determined by the activity metrics associated with the client computing platforms and/or determined by other techniques). The interface 1100 may provide options to view usage percentages based on overall usage time, number of gaming sessions, and/or other parameter for indicating usage of the different class client computing platforms by the first user.

The detailed device usage information 1130 may include additional details about client computing platform usage by the first user. Detailed information may include information about gaming sessions the first user participated in (e.g., start time, end time, duration, etc.), the client computing platform the first user used during each of the sessions, whether or not the first user switch client computing platforms during the game sessions, and/or other information and/or activity metrics associated with the client computing platforms. This information may be used by the second user when making a decision of whether or not to accept the first user into their party to form the first multi-user party (e.g., via selecting "Yes" at the request interface 1000 in FIG. 10).

Figure 12:
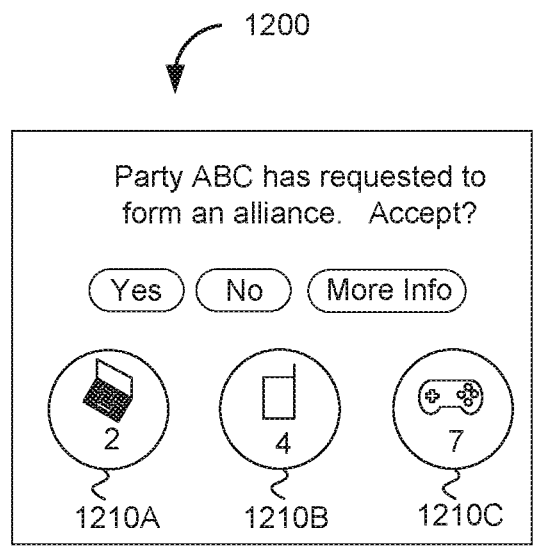
FIG. 12 illustrates a request interface used to display device information and allow users to confirm or deny a party formation request related to a party who is making the party formation request, according to an aspect of the invention.

FIG. 12 illustrates another embodiment of the second request interface 1200 used to display device information related to a party (Party ABC) who is making a party formation request with the second user (e.g., wherein if the second user joins Party ABC the first multi-user party will be formed), according to an aspect of the invention. In some embodiments, the first user may be a member of the party (Party ABC). In some embodiments, the first user may be the member of Part ABC who is requesting the second user to join.

Device information related to Party ABC may include information indicative of the features and functions of the different client computing platforms used by the members of the Party ABC. Currently shown, the second request interface 1200 may include one or more device indicators depicting the various client computing platform classes used by the members of the Party ABC, and showing the number of members currently using the different client computing platforms. As an illustrative example, the second request interface 1200 currently shows two members using laptops 1210A, four members using smartphones 1210B, and seven members using gaming consoles 1210C. The second user may either confirm or deny the request based on this information.

Figure 13:
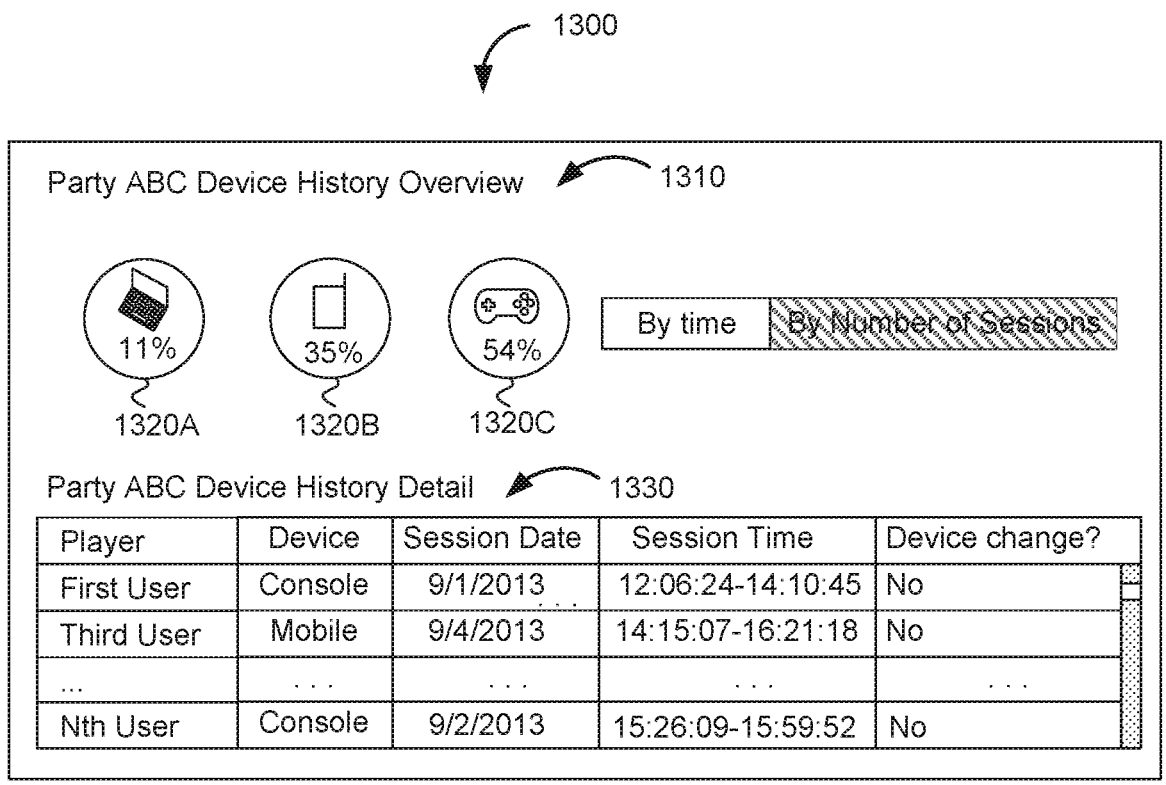
FIG. 13 illustrates an interface used to display device usage information relating to users belonging to a party who is making a party formation request to form a party with another player, according to an aspect of the invention.

In some embodiments, the second request interface 1200 may include an option to view more device information through an additional interface (e.g., pop up window) and/or as part of the second request interface 1200 (e.g., drop down menus appear and/or the second request interface 1200 expands). In particular, FIG. 13 illustrates an interface 1300 used to display more device information relating to users belonging to Party ABC when the selection to view more device information is made, according to an aspect of the invention. Interface 1300 may depict device usage information 1310, 1330 relating to the members of Party ABC. The interface 1300 may include device usage overview information 1310, detailed device usage information 1330, and/or other information.

Overview information 1110 may include device indicators showing all of the available classes (or other device information) of the client computing platforms used by the members of Party ABC (e.g., currently depicting a laptop 1320A, smartphone 1320B, and gaming console 1320C). The overview information 1110 may additionally indicate the percentage of usage of the different client computing platforms by members of the party. The overview information 1110 may include other information. The interface 1100 may provide options to view usage percentages based on overall usage time by the members, number of gaming sessions, and/or other parameter for indicating usage of the different client computing platforms by the members.

The detailed device usage information 1330 may include additional details about client computing platform usage (e.g., activity metrics) by the members of Party ABC. Detailed information may include information about gaming sessions the members and/or the party as a whole participated in (e.g., start time, end time, duration, etc.), the client computing platforms the members used during the sessions, whether or not the members individually changed client computing platforms during the game sessions, and/or other information and/or activity metrics as described herein. This information may be used by the second user when making a decision of whether or not to accept the party formation request with Party ABC (and consequently the formation of the first multi-user party).

Figure 14:
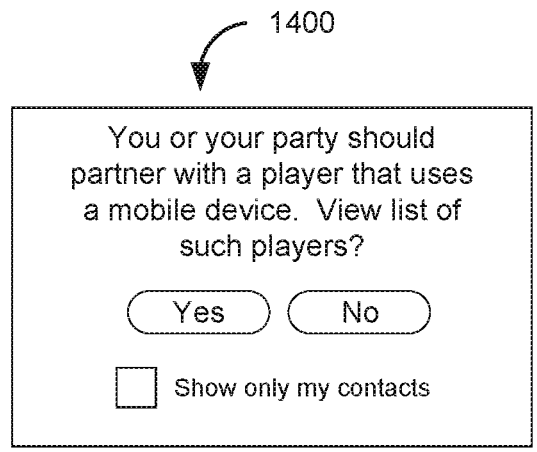
FIG. 14 illustrates an interface used to recommend to a user party formation with users associated with a particular client computing platform, according to an aspect of the invention.
Figure 15:
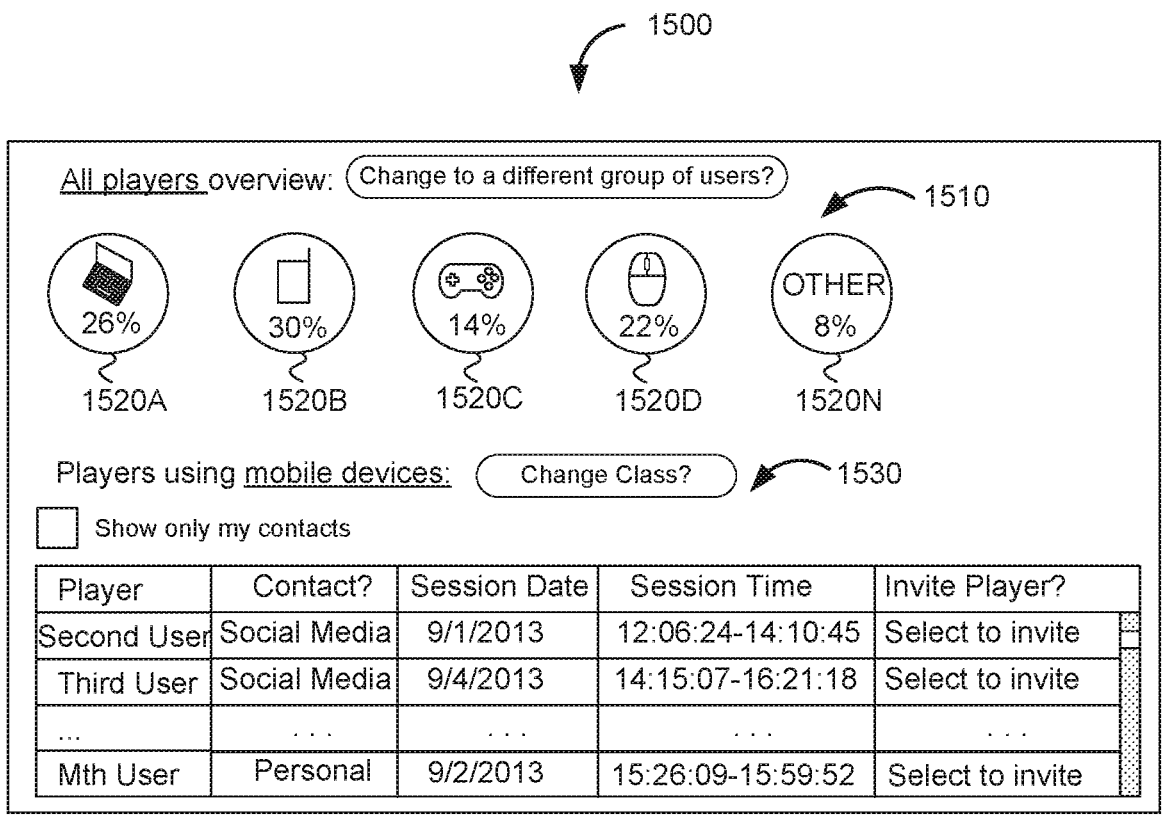
FIG. 15 illustrates a request interface used to display device information of users to facilitate enhance party formation for a user wishing to initiate party formation requests to form a party with other users, according to an aspect of the invention.
Figure 16:
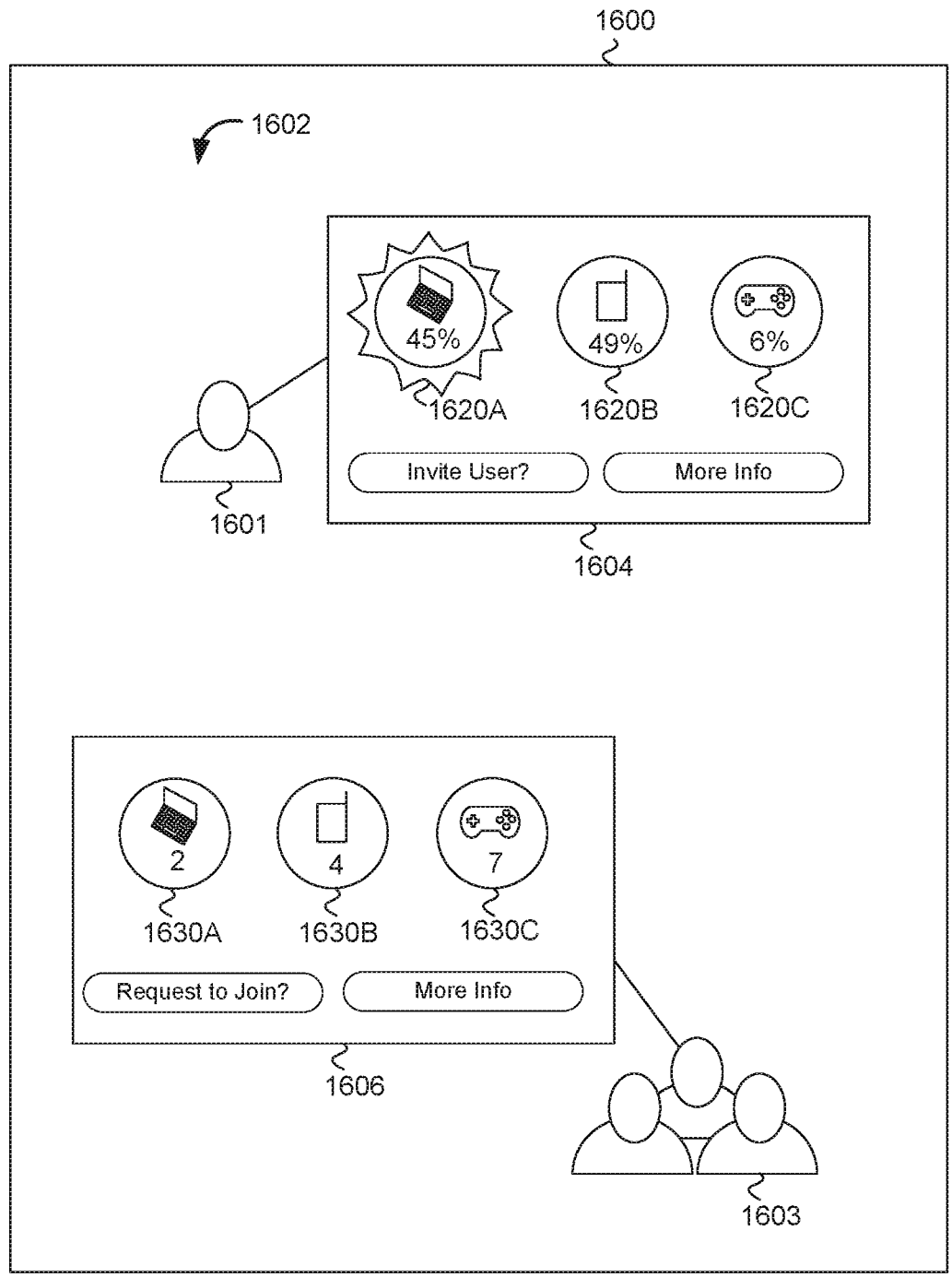
FIG. 16 illustrates request interfaces used to display device information in association with user representations in an instance of a virtual space, according to an aspect of the invention.

Referring now to FIGS. 14-16, various examples of the first request interface and/or other interface(s) configured to receive entry and/or selection from the first user to initiate the first multi-user party formation request to be sent to the second user and/or other users are provided.

In some embodiments, recommendations to initiate party formation requests to form parties may be presented to the first user and/or other users of the virtual space. For example, recommendations may be sent to the first user which recommends initiating party formation requests with other users who are associated with a particular class of client computing platform, a particular in-game ability, and/or other associated feature. As an illustrative example, FIG. 14 illustrates an interface 1400 used to recommend that a user, such as the first user, initiates a party formation request with other users of a particular class of client computing platform. In particular, the interface 1400 may be presented to the first user including a recommendation to form the first multi-user party with other users who are associated with a particular class of client computing platform (e.g., mobile device, gaming console, or other). The other users may include the second user.

Recommendations may be made based on the first user benefiting from forming the first multi-user party with the users of a particular class client computing platform (such as the second user). A benefit may include, for example, the users of a particular class client computing platform may be associated with one or more in-game capabilities, roles, and/or other associated features which the first user may not otherwise be associated with or available. Once the first user initiates the request (e.g., selects one or more users to invite to form a party) an instance of a request interface, such as those previously described embodiments of the second request interface, may be presented to the recipient users to confirm or deny the request.

In some embodiments, recommendations may be made by virtue of the party formation component 140 identifying the benefits a user and/or party would obtain by forming a party with another user and/or party who is associated with a particular client computing platform. For example, the party formation component 140 may be configured to identify a particular class of client computing platform in which the first multi-user party would benefit by having one of its members interact with the instance of the virtual space using the particular class of client computing platform. The interactions monitored by the interaction component 128 (e.g., FIG. 1) may determine that the first user (and/or party the first user is a member of) is limited in one or more activities performed within the virtual space. The first user may be limited for example, in the accessibility of in-game content by virtue of the first client computing platform and/or other client computing platforms used by the first user. The party formation component 140 may be configured to identify a particular class of client computing platform which made help the first user to perform and/or complete the one or more activates in the virtual space based on the monitoring.

The party formation component 140 may be configured to determine one or more users who use the identified client computing platform to interact with the instance of the virtual space based on device information obtained by the device information component 132. Thereafter, the party formation component 140 may be configured to provide an indication that a party would benefit from having the determined user(s) as members of the party.

For example, the party formation component 140 may be configured to determine that the second user uses the particular class of client computing platform which would benefit the first multi-user party, based on the second set of device information (obtained by device information component 132). The party formation component 140 may provide an indication, for example to the first user in the first request interface, that the first multi-user party would benefit from having the second user as a member of the first multi-user party. An indication to the first user may include the second user being identified on the first request interface and/or other interface(s) (e.g., first request interface 1500 shown in FIG. 15).

The request to form the first multi-user party may be processed after the indication is provided (e.g., the first user obtains the indication, selects to invite the second user, and the second user confirms the request).

In some embodiments, users may be which to search for users who use a particular client computing platform. The party formation component 140 may be configured to process a query that requests to obtain information related to users of the virtual space that use a particular class of client computing platform, particular in-game capabilities, and/or other associated attribute. The information which may be obtained as a result of the query may include identification of the users (e.g., a user name, avatar name, etc.) that use the particular class of client computing platform. In some embodiments, the query may be a query input by a user wishing to obtain such information (e.g. the first user specifically identifies a particular class of client computing platforms of query to identify users of the particular class client computing platform).

The party formation component 140 may be configured to identify, directly or indirectly responsive to the query, one or more users of the virtual space that use the particular class of client computing platform. For example, if the second user uses a particular class of client computing platform, and the first user inputs a query requesting to obtain information relating to users that use the particular class of client computing platform, the second user may be identified by the party formation component 140 as using the particular class of client computing platform queried by the first user.

The party formation component 140 may be configured to provide the identified second user to the first user (e.g., in the first request interface and/or other interface(s)). In some embodiments, the request to form the first multi-user party may be processed by the party formation component 140 after the identification is provided to the first user (e.g., after the first users selects to invite the second user and the second user confirms the request).

Although interface 1400 is currently shown as a stand-alone interface for providing a recommendation of party formation, in some embodiments, such a recommendation may be provided in the same or similar interface as the first request interface configured to receive entry and/or selection from the first user facilitating initiation of a party formation request. For example, if the first user selects "Yes" on the recommendation interface 1400, the first user may be presented the first request interface as a separate interface (e.g., a pop up window), or the first request interface may be part of the recommendation interface 1400 (e.g., drop down menus appear and/or the interface 1400 expands).

In particular, FIG. 15 illustrates an embodiment of the first request interface 1500 including device information, sets of device information, and/or other information related to particular client computing platforms used by users in the virtual space to facilitate enhanced party formation for users initiating party formation request. In some embodiments, first request interface 1500 may be presented to the first user responsive to the recommendation presented at interface 1400 in FIG. 14 (e.g., the first user selects 'Yes') as described herein. In some embodiments, first request interface 1500 may be presented to the first user responsive to the first user inputting a query to identify users of a particular class of client computing platform as described herein.

The first request interface 1500 may include, for viewing by the first user, device information 1510, 1530 indicative of the features and functions of the client computing platforms used by the users in the virtual space. In particular, device information 1530 may include the second set of information related to the second client computing platform used by the second user (e.g., the class of the second client computing platform, activity metrics associated with the second client computing platform, and/or other information included in the second set of information). The first request interface 1500 may be configured to receive entry and/or selection by the first user to change the particular class of client computing platform to obtain a list of users who use that particular class of client computing platform. For example, the first user may select a "Change Class" filter option to obtain a list of users who use a different class of client computing platform. When a different class is selected, the party formation component 140 component may be configured to process a query that requests to obtain information related to users of the virtual space that use the newly selected particular class of client computing platform, as described herein.

The first request interface 1500 may include device information 1510 including an overview of the classes of client computing platforms used by all of the users of the virtual space, and/or a particular group of users of the virtual space (currently shown as laptop 1520A, smartphone 1520B, gaming console 1520C, desktop computer 15200, and other 1520N). Device information 1510 may indicate the percentage of usage of the different client computing platforms by the users of the virtual space. The first user may be able to change which group of users (e.g., user class) are searched when the query to search users of a particular client computing platform is processed (e.g., All players, contacts only, and/or other user group classification).

FIG. 16 illustrates other embodiments of the first request interface 1604, 1604 being part of an existing interface 1600. For example, the existing interface 1600 may be an interface depicting user representations in the instance of the virtual space. The interface 1600 may be an interface depicting a virtual location 1602 within the virtual space (e.g., virtual café or other virtual location) wherein user representations associated with the user of the virtual space (e.g., avatars) may congregate and/or interact, according to an aspect of the invention. As currently shown, the interface 1600 may be modified to include one or more embodiments of the first request interface 1604, 1606 configured to receive entry and/or selection from the first user to form the first multi-user party with the second user and/or other users.

First request interface 1604 may be an interface associated with a user representation 1601 associated with the second user. For example, first request interface 1604 may be a menu, window, and/or other interface which follows and/or trails the user representation 1601 throughout the virtual location 1602. The first request interface 1604 may include, for viewing by the first user, the second set of information related to the second client computing platform used by the second user. The second set of information included in the first request interface 1604 may include device indicators of the different class client computing platforms used by the second user (e.g., laptop 1620A, smartphone 1620B, and gaming console 1620C). The device indicator which the second user is currently using may be highlighted (e.g., the laptop 1620A). The first request interface 1604 may be configured to receive entry and/or selection from the first user to form the first multi-user party with the second user (e.g., select "Invite User"). The first request interface 1604 may include an option to view more device information relating to the client computing platforms used by the second user. For example by selecting "More Info", the first user may be presented an instance of an interface the same as or similar to interface 1100 shown in FIG. 11, however including information relating to the client computing platforms used by the second user (e.g., the second set of information relating to the second client computing platform used by the second user) and not the first user as shown in the interface 1100 in FIG. 11. The instance of the interface including the more device information may be an interface separate from the first request interface 1604 (e.g., a pop up window), and/or part of the first request interface 1604 (e.g., the first request interface 1604 expands and/or drop down menus appear).

First request interface 1606 may be an interface associated with a multi-user party representation 1603 associated with a multi-user party including multiple users of the virtual space. In some embodiments, the multiple users may include the second user. The first request interface 1606 may be a menu which follows and/or trails the multi-user party representation 1603 throughout the virtual location 1602. The first request interface 1606 may include, for viewing by the first user, device information indicative of the features and functions of the client computing platform used by the members of the party (e.g., laptop 1630A, smartphone 1630B, and gaming console 1630C). The first request interface 1606 may be configured to receive entry and/or selection from the first user to form the first multi-user party with the party (e.g., select "Request to Join").

The first request interface 1606 may include an option to view more device information relating to the client computing platforms used by the users of the party. For example by selecting "More Info", the first user may be presented an instance of an interface the same as or similar to interface 1300 shown in FIG. 13, however including information relating to the client computing platforms used by the users associated with the multi-user party representation 1603 (e.g., and not Party ABC). For example, the instance of the interface including the more device information may include the second set of information related to the second client computing platform used by the second user. The instance of the interface including the more device information may be an interface separate from the first request interface 1606 (e.g., a pop up window), and/or part of the first request interface 1606 (e.g., the first request interface 1606 expands and/or drop down menus appear).

Returning to FIG. 1, in some embodiments, during and/or after formation processing the request to from the first multi-user party by the party formation component 140, the capabilities assignment component 136 may be configured to assign one or more in-game capabilities and/or one or more access to in-game content to the first user and/or second user. The assignments may be based on the first set of device information (for the first user) and/or the second set of device information (for the second user) such that the first multi-user party includes members that have the one or more in-game capabilities and/or the one or more access to in-game content after the first user and/or second user is associated with the first multi-user party.

In some implementations, the server 120, client computing platforms 150, and/or external resources 160 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which servers 120, client computing platforms 150, and/or external resources 160 may be operatively linked via some other communication media.

A given client computing platform 150 may include one or more processors configured to execute computer program components. The computer program components may be configured to enable an expert or user associated with the given client computing platform 150 to interface with system 100 and/or external resources 160, and/or provide other functionality attributed herein to client computing platforms 150. By way of non-limiting example, the given client computing platform 150 may include one or more of a desktop computer, a laptop computer, a handheld computer, a tablet computing platform, a NetBook, a Smartphone, a gaming console, and/or other computing platforms.

The external resources 160 may include sources of information, hosts and/or providers of virtual environments outside of system 100, external entities participating with system 100, and/or other resources. In some implementations, some or all of the functionality attributed herein to external resources 160 may be provided by resources included in system 100.

The server 120 may include electronic storage 122, one or more processors 121, and/or other components. The server 120 may include communication lines, or ports to enable the exchange of information with a network and/or other computing platforms. Illustration of server 120 in FIG. 1 is not intended to be limiting. The server 120 may include a plurality of hardware, software, and/or firmware components operating together to provide the functionality attributed herein to server 120. For example, server 120 may be implemented by a cloud of computing platforms operating together as server 120.

Electronic storage 122 may comprise electronic storage media that electronically stores information. The electronic storage media of electronic storage 122 may include one or both of system storage that is provided integrally (i.e., substantially non-removable) with server 120 and/or removable storage that is removably connectable to server 120 via, for example, a port (e.g., a USB port, a firewire port, etc.) or a drive (e.g., a disk drive, etc.). Electronic storage 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 122 may include one or more virtual storage resources (e.g., cloud storage, a virtual private network, and/or other virtual storage resources). Electronic storage 122 may store software algorithms, information determined by processor 121, information received from server 120, information received from client computing platforms 150, and/or other information that enables server 120 to function as described herein.

Processor(s) 121 may be configured to provide information processing capabilities in server 120. As such, processor 121 may include one or more of a digital processor, an analog processor, a digital circuit designed to process information, an analog circuit designed to process information, a state machine, and/or other mechanisms for electronically processing information. Although processor 121 is shown in FIG. 1 as a single entity, this is for illustrative purposes only. In some implementations, processor 121 may include a plurality of processing units. These processing units may be physically located within the same device, or processor 121 may represent processing functionality of a plurality of devices operating in coordination. The processor 121 may be configured to execute components 124, 126, 128, 130, 132, 134, 136, 138, and 140. Processor 121 may be configured to execute components 124, 126, 128, 130, 132, 134, 136, 138, and 140 by software; hardware; firmware; some combination of software, hardware, and/or firmware; and/or other mechanisms for configuring processing capabilities on processor 121.

It should be appreciated that although components 124, 126, 128, 130, 132, 134, 136, 138, and 140 are illustrated in FIG. 1 as being co-located within a single processing unit, in implementations in which processor 121 includes multiple processing units, one or more of components 124, 126, 128, 130, 132, 134, 136, 138, and 140 may be located remotely from the other components. The description of the functionality provided by the different components 124, 126, 128, 130, 132, 134, 136, 138, and 140 described below is for illustrative purposes, and is not intended to be limiting, as any of components 124, 126, 128, 130, 132, 134, 136, 138, and 140 may provide more or less functionality than is described. For example, one or more of components 124, 126, 128, 130, 132, 134, 136, 138, and 140 may be eliminated, and some or all of its functionality may be provided by other ones of components 124, 126, 128, 130, 132, 134, 136, 138, and 140. As another example, processor 121 may be configured to execute one or more additional components that may perform some or all of the functionality attributed below to one of components 124, 126, 128, 130, 132, 134, 136, 138, and 140.

Although an in-game capability is described herein as having its own requirements or being associated with particular devices, two or more in-game capabilities may together have requirements such that if the requirements are not satisfied then neither of the two or more in-game capabilities will be made available for the user.

Furthermore, the predefined associations between devices and in-game capabilities may be arbitrary such that they may be configured by the developer and/or by the users (e.g., players). Additionally, in some embodiments, one or more device requirements may be a matter of scale such that if a given requirement is not satisfied, some level of in-game capability may be provided for the user based on a level of satisfaction. For example, if a given requirement has been 80% satisfied, then a fraction (e.g., 80 or other fraction) of the in-game capability may be provided for the user. Such scaled in-game capability may be relevant to in-game capabilities such as content items (e.g., where the in-game capability relates to a number of content items), roles (e.g., scaled back time in which a role may be played by the user based on the scaled requirement satisfaction), and/or other scaled in-game capability.

Figure 6:
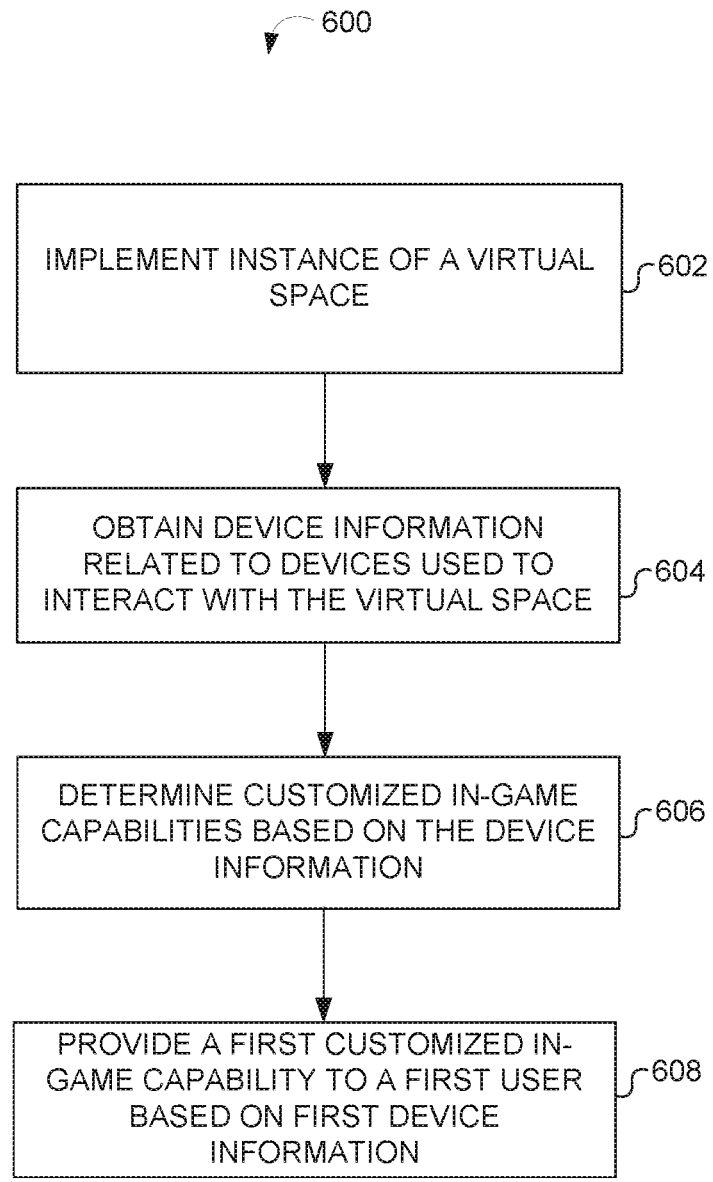
FIG. 6 illustrates an example of a method of determining in-game capabilities based on a device used to access the virtual space of a game, according to an aspect of the invention.

FIG. 6 illustrates an example of a method 600 of determining in-game capabilities based on a device used to access the virtual space of a game, according to an aspect of the invention. The operations of method 600 and other methods described herein presented below are intended to be illustrative. In some embodiments, method 600 and other methods described herein may be accomplished with one or more additional operations not described, and/or without one or more of the operations discussed. Additionally, the order in which the operations of method 600 and other methods described herein is not intended to be limiting.

In some embodiments, method 600 and other methods described herein may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 600 and other methods described herein in response to instructions stored electronically on an electronic storage medium. The one or more processing devices may include one or more devices configured through hardware, firmware, and/or software to be specifically designed for execution of one or more of the operations of method 600 and other methods described herein.

In an operation 602, an instance of a virtual space may be executed. In an operation 604, device information related to devices used to interact with the virtual space may be obtained. The device information may include first device information related to a device used by a first user to interact with the virtual space. The device information may be obtained from the users, the user devices, from predefined device information sources (e.g., the data structures described herein), and/or other sources of device information.

In an operation 606, customized in-game capabilities may be determined based on the device information, including a first customized in-game capability for the first user based on first device information. In an operation 608, the first customized in-game capability may be provided for use in the virtual space by the first user.

Figure 7:
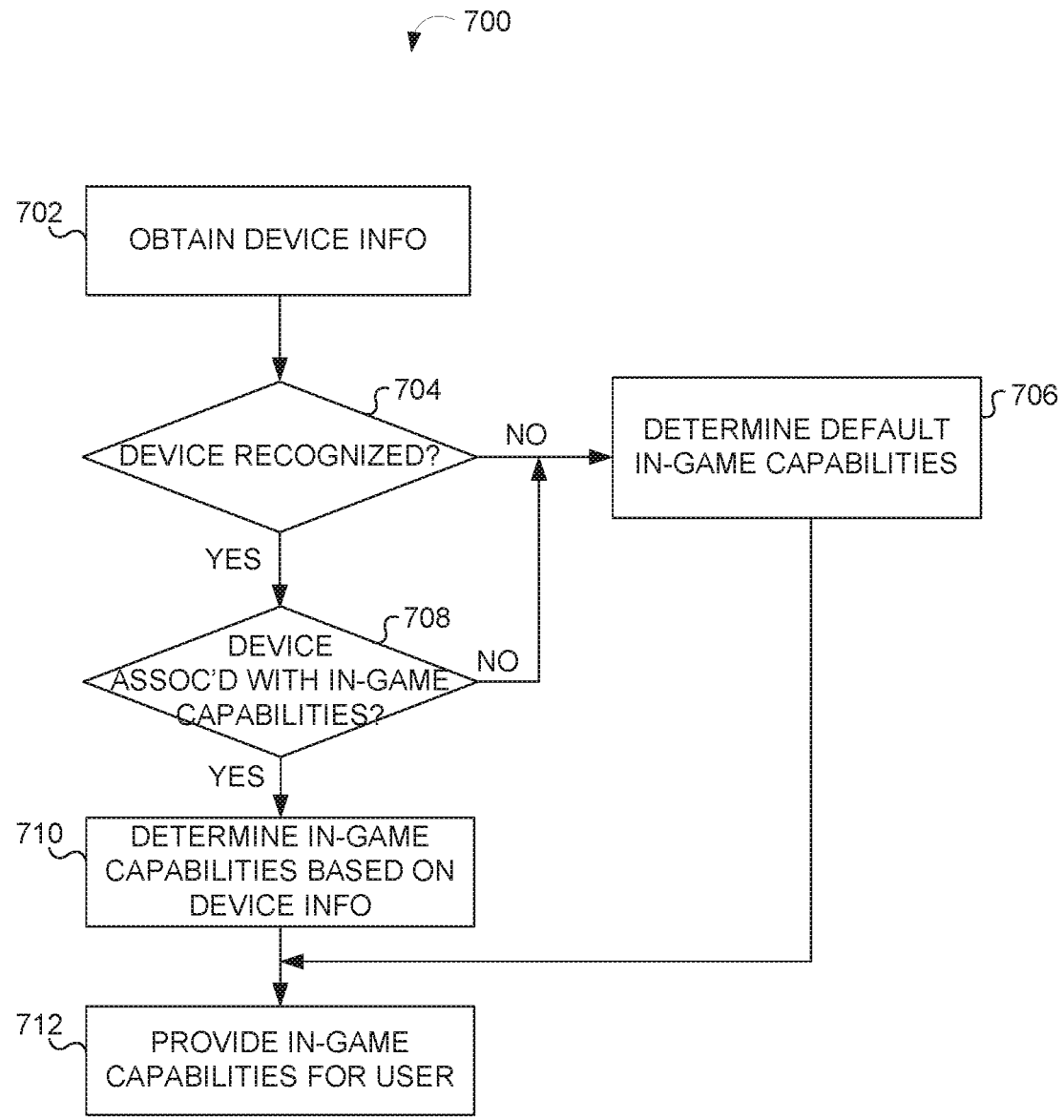
FIG. 7 illustrates an example of a method of determining in-game capabilities based on predefined associations between different devices and different in-game capabilities, according to an aspect of the invention.

FIG. 7 illustrates an example of a method 700 for determining in-game capabilities based on predefined associations between different devices and different in-game capabilities, according to an aspect of the invention. In an operation 702, device information for a user device (e.g., a client computing platform 150 illustrated in FIG. 1) may be obtained. In an operation 704, a determination of whether the device is recognized may be made. For example, predefined information (e.g., data structure 300) may be consulted to determine whether the device information is known by method 700. If the device is not recognized, default in-game capabilities may be determined in an operation 706. For example, the default in-game capabilities may include none, some, or all of the in-game capabilities that are available.

On the other hand, if the device is recognized, a determination of whether the device is associated with one or more in-game capabilities may be made in an operation 708. For example, data structure 500 may be consulted to determine whether associations between any portion of the device information and one or more in-game capabilities are predefined. If the device is not associated with in-game capabilities, then default in-game capabilities may be determined in operation 706. If the device is associated with in-game capabilities, such in-game capabilities may be determined in an operation 710. In an operation 712, the in-game capabilities may be provided to the user such that the capabilities are usable by the user in the virtual space.

Figure 8:
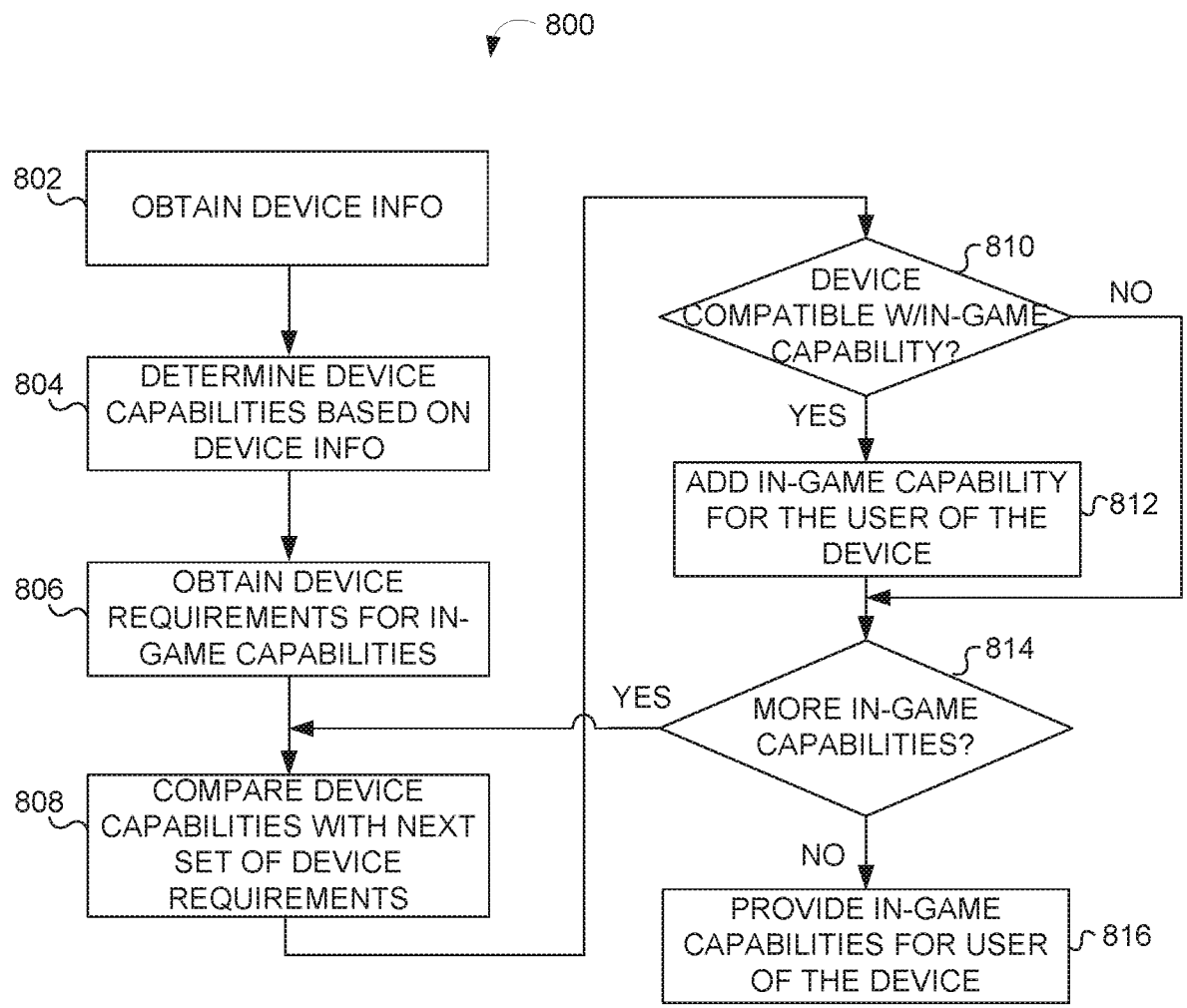
FIG. 8 illustrates an example of a method of providing in-game capabilities based on whether devices meet predefined requirements of in-game capabilities, according to an aspect of the invention.

FIG. 8 illustrates an example of a method 800 of providing in-game capabilities based on whether devices meet predefined requirements of in-game capabilities, according to an aspect of the invention. In an operation 802, device information may be obtained. In an operation 804, device capabilities may be determined based on the device information. For example, the device capabilities may be included with the device information and/or may be looked up using predefined information (e.g., information stored in data structure 300).

In an operation 806, device requirements for in-game capabilities may be obtained. For example, the device requirements for a given in-game capability may be obtained from predefined information (e.g., information stored in data structure 400). In an operation 808, the device capabilities may be compared with the device requirements for the given in-game capability.

In an operation 810, a determination of whether the device is compatible with each in-game capability may be made based on the comparison. A user device may be compatible with a given in-game capability when the user device capabilities meet or otherwise satisfy the device requirements for the given in-game capability.

If the user device is compatible with the given in-game capability, the in-game capability may be added or otherwise provided for the user of the user device in an operation 812 such that the given in-game capability is usable by the user in the virtual space. In an operation 814, a determination of whether there exist more in-game capabilities to potentially provide may be made. If more in-game capabilities exist, method 800 may return to operation 808, where the next in-game capability may be processed. If no other in-game capabilities are to be processed, the in-game capabilities for which the user device is compatible may be provided for the user such that the user is access the in-game capabilities when interacting with the virtual space.

Figure 9:
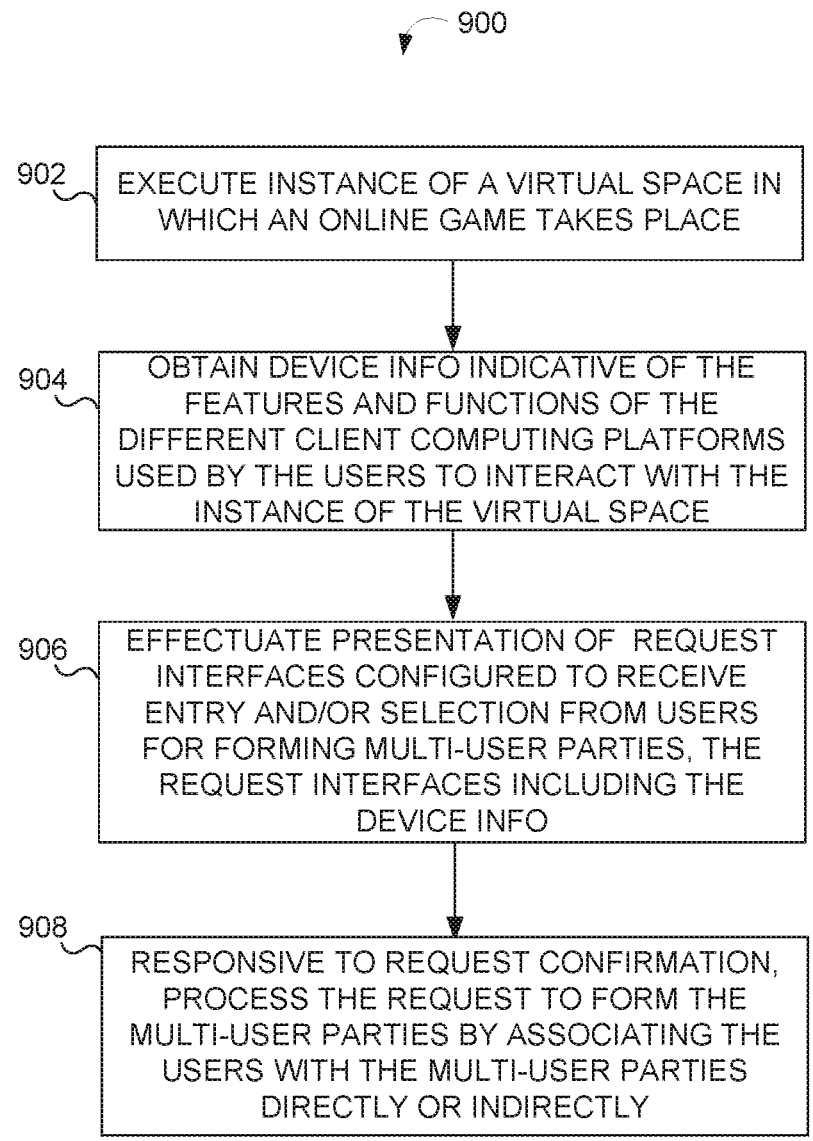
FIG. 9 illustrates an example of a method of obtaining and providing device information to facilitate party formation decisions based on the device information, according to an aspect of the invention.

FIG. 9 illustrates an example of a method 900 of obtaining and providing device information to facilitate party formation decisions based on the device information, according to an aspect of the invention. At an operation 902, an instance of a virtual space in which an online game takes place may be executed. In some implementations, operation 902 may be performed by a space component the same or similar as space component 125 (shown in FIG. 1 and described herein).

At an operation 904, device information indicative of the features and functions of the different client computing platforms used by the users to interact with the instance of the virtual space may be obtained. The device information may include a first set of information indicative of the features and functions of a first client computing platform used by a first user of the virtual space, and a second set of information indicative of the features and functions of a second client computing platform used by a second user of the virtual space. In some implementations, operation 904 may be performed by a device information component the same or similar as device information component 132 (shown in FIG. 1 and described herein).

At an operation 906, presentation of request interfaces configured to receive entry and/or selection from users for forming multi-user parties may be effectuated. The request interfaces may include, for viewing by users of the virtual space, device information indicative of the features and functions of the different client computing platforms used by the users of the virtual space. The request interface may include a first request interface that is configured to receive entry and/or selection from the first user to form a first multi-user party with other users, wherein the other users may include the second user. The first request interface may include, for viewing by the first user, the second set of information related to the second client computing platform used by the second user. The request interface may include second request interface that is configured to receive entry and/or selection from the second user to confirm the request to form the first multi-user party. The second interface may include, for viewing by the second user, the first set of information related to the first client computing platform used by the first user. In some implementations, operation 906 may be performed by a party formation component the same or similar as party formation component 140 (shown in FIG. 1 and described herein).

At an operation 908, responsive to request confirmation by the second user, the request to form the first multi-user party including the first user and the second user may be processed. Processing may include associating the first user and the second user with the first multi-user party directly or indirectly. In some implementations, operation 908 may be performed by a party formation component the same or similar as party formation component 140 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A computer-implemented method comprising:
receiving, from a client computing device operated by a first user during execution of an instance of a multi-user online game, a request to obtain information identifying users of the multi-user online game as potential members to join or form a multi-user party that includes the first user, wherein the multi-user online game enables the multi-user party to cooperatively play at least a portion of the multi-user online game;
identifying the potential members to join or form the multi-user party, wherein the potential members include at least a second user and a third user of the multi-user online game;
determining a type or a class of computing device used by each of the potential members to access the multi-user online game;
generating a user interface for display to the first user within the multi-user online game, wherein the user interface includes information identifying at least a subset of the potential members and further visually indicates a respective type or class of computing device used by each of the at least a subset of the potential members to access the multi-user online game, wherein the user interface includes identification of the second user and a visual indicator that graphically indicates the type or the class of computing device used by the second user, wherein the user interface further includes a selectable option to add the second user to the multi-user party;
receiving an indication that the selectable option within the user interface has been selected; and
adding the second user to the multi-user party based at least in part on the indication that the selectable option has been selected.

2. The computer-implemented method of claim 1, wherein the visual indicator graphically depicts hardware associated with one of a desktop computing device, a laptop computing device, a tablet device, a mobile phone, or a gaming console.

3. The computer-implemented method of claim 1 further comprising executing an instance of the multi-user online game in which the first user and the second user cooperatively play.

4. The computer-implemented method of claim 1 further comprising, prior to adding the second user to the multi-user party, obtaining acceptance from the second user to join the multi-user party.

5. The computer-implemented method of claim 1, wherein the type of computing device used by the second user comprises at least one of a brand, a model or an operating system of the computing device used by the second user.

6. The computer-implemented method of claim 1, wherein the class of computing device used by the second user comprises at least one of a desktop computing device, a laptop computing device, a tablet device, a mobile phone, or a gaming console.

7. The computer-implemented method of claim 1, wherein different classes of computing devices are associated with different in-game capabilities, and wherein the second user is identified as one of the potential members based at least in part on an in-game capability associated with the class of computing device used by the second user.

8. The computer-implemented method of claim 1, wherein the second user is identified as one of the potential members based at least in part on a determination that a class of computing device used by the second user is a class of computing device specified by the first user.

9. A system comprising:
one or more physical processors configured with machine-readable instructions to perform operations comprising:
receiving, from a client computing device operated by a first user during execution of an instance of a multi-user online game, a request to obtain information identifying users of the multi-user online game as potential members to join or form a multi-user party that includes the first user, wherein the multi-user online game enables the multi-user party to cooperatively play at least a portion of the multi-user online game;
identifying the potential members to join or form the multi-user party, wherein the potential members include at least a second user of the multi-user online game;
determining a type or a class of computing device used by each of the potential members to access the multi-user online game;
generating a user interface for display to the first user within the multi-user online game, wherein the user interface includes information identifying at least a subset of the potential members and further visually indicates a respective type or class of computing device used by each of the at least a subset of the potential members to access the multi-user online game, wherein the user interface includes identification of the second user and a visual indicator that graphically indicates the type or the class of computing device used by the second user, wherein the user interface further includes a selectable option to add the second user to the multi-user party;

receiving an indication that the selectable option within the user interface has been selected; and
adding the second user to the multi-user party based at least in part on the indication that the selectable option has been selected.

10. The system of claim 9, wherein the system is further configured to execute an instance of the multi-user online game in which the first user and the second user cooperatively play.

11. The system of claim 9, wherein the class of computing device used by the second user to access the game is different than a class of the client computing device operated by the first user.

12. The system of claim 9, wherein the class of computing device used by the second user comprises at least one of a desktop computing device, a laptop computing device, a tablet device, a mobile phone, or a gaming console.

13. The system of claim 9, wherein the visual indicator graphically depicts hardware associated with one of a desktop computing device, a mobile computing device, or a gaming console.

14. The system of claim 9, further comprising presenting a recommendation to the first user that the multi-user party include at least one user associated with a particular class of computing device.

15. The system of claim 14, wherein the recommendation is determined based at least in part on an in-game capability associated with the particular class of computing device.

16. The system of claim 9, wherein the user interface includes indicators of each of two or more different classes of computing devices that have been used by the second user to access the game.

17. A non-transitory storage medium storing machine-readable instructions that, when executed by one or more computer systems, configure the one or more computer systems to perform operations comprising:
receiving, from a client computing device operated by a first user during execution of an instance of a multi-user online game, a request to obtain information identifying users of the multi-user online game as potential members to join or form a multi-user party that includes the first user, wherein the multi-user online game enables the multi-user party to cooperatively play at least a portion of the multi-user online game;
identifying the potential members to join or form the multi-user party, wherein the potential members include at least a second user of the multi-user online game;
determining a type or a class of computing device used by each of the potential members to access the multi-user online game;
generating a user interface for display to the first user within the multi-user online game, wherein the user interface includes information identifying at least a subset of the potential members and further visually indicates a respective type or class of computing device used by each of the at least a subset of the potential members to access the multi-user online game, wherein the user interface includes identification of the second user and a visual indicator that graphically indicates the type or the class of computing device used by the second user, wherein the user interface further includes a selectable option to add the second user to the multi-user party;
receiving an indication that the selectable option within the user interface has been selected; and adding the second user to the multi-user party based at least in part on the indication that the selectable option has been selected.

18. The non-transitory storage medium of claim 17, wherein the multi-user party comprises an alliance or a team.

19. The non-transitory storage medium of claim 17, wherein different classes of computing devices are associated with different in-game capabilities, and wherein the operations further comprise selecting the second user to identify in the user interface based at least in part on an in-game capability associated with the class of computing device used by the second user.

20. The non-transitory storage medium of claim 17, wherein the visual indicator graphically depicts hardware associated with one of a desktop computing device, a mobile computing device, or a gaming console.

* * * * *